United States Patent
Miura et al.

(10) Patent No.: US 12,202,318 B2
(45) Date of Patent: Jan. 21, 2025

(54) AIR CONDITIONER FOR VEHICLE

(71) Applicant: DENSO CORPORATION, Aichi-pref. (JP)

(72) Inventors: Kouji Miura, Kariya (JP); Yoshiki Katoh, Kariya (JP); Masamichi Makihara, Kariya (JP); Atsushi Yamada, Kariya (JP); Kenta Kayano, Kariya (JP); Hiroaki Kawano, Kariya (JP); Tooru Okamura, Kariya (JP); Naoya Makimoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 272 days.

(21) Appl. No.: 17/974,682

(22) Filed: Oct. 27, 2022

(65) Prior Publication Data
US 2023/0052705 A1 Feb. 16, 2023

Related U.S. Application Data

(63) Continuation of application No. PCT/JP2021/011582, filed on Mar. 22, 2021.

(30) Foreign Application Priority Data

May 1, 2020 (JP) .................................. 2020-080913

(51) Int. Cl.
*B60H 1/32* (2006.01)
*B60H 1/00* (2006.01)
*F25B 5/02* (2006.01)

(52) U.S. Cl.
CPC ....... *B60H 1/3205* (2013.01); *B60H 1/00278* (2013.01); *B60H 1/00485* (2013.01);
(Continued)

(58) Field of Classification Search
CPC ............ B60H 1/00278; B60H 1/00485; B60H 1/00885; B60H 1/3205; B60H 2001/003;
(Continued)

(56) References Cited

U.S. PATENT DOCUMENTS

| 6,016,662 A | 1/2000 | Tanaka et al. |
| 2015/0191072 A1 | 7/2015 | Inoue et al. |

(Continued)

FOREIGN PATENT DOCUMENTS

| JP | H1053019 A | 2/1998 |
| JP | 2014037959 A | 2/2014 |

(Continued)

*Primary Examiner* — Jonathan Bradford
(74) *Attorney, Agent, or Firm* — Harness, Dickey & Pierce, P.L.C.

(57) ABSTRACT

An air conditioner for a vehicle includes a refrigeration cycle, a heating unit and a control unit. The refrigeration cycle includes an air-conditioning evaporator, a chilling evaporator, an air-conditioning side flow path, a detour flow path and an air-conditioning flow rate adjustment unit. The control unit includes a determination unit that determines whether a condensation condition is satisfied when a refrigerant is flowing through the chilling evaporator via the detour flow path in a state where an inflow of a refrigerant into the air-conditioning evaporator is prohibited. When the determination unit determines that the condensation condition is satisfied, the control unit controls the air-conditioning flow rate adjustment unit to allow an inflow of a refrigerant into the air-conditioning evaporator as a condensation suppression operation for suppressing condensation of a refrigerant in the air-conditioning evaporator.

8 Claims, 10 Drawing Sheets

(52) U.S. Cl.
CPC ........... B60H 1/00885 (2013.01); F25B 5/02 (2013.01); *B60H 2001/003* (2013.01); *B60H 2001/00307* (2013.01); *B60H 2001/3263* (2013.01); *F25B 2500/28* (2013.01); *F25B 2600/2513* (2013.01)

(58) Field of Classification Search
CPC ............... B60H 2001/3263; F25B 5/02; F25B 2500/28; F25B 2600/2513
See application file for complete search history.

(56) References Cited

U.S. PATENT DOCUMENTS

| | | | |
|---|---|---|---|
| 2017/0021698 A1 | 1/2017 | Hatakeyama et al. | |
| 2019/0366800 A1* | 12/2019 | Durrani | B60H 1/00921 |
| 2020/0171919 A1 | 6/2020 | Ishizeki et al. | |

FOREIGN PATENT DOCUMENTS

| | | | |
|---|---|---|---|
| JP | 2015186989 A | 10/2015 | |
| JP | 2019023023 A | 2/2019 | |

* cited by examiner

HEATING/CHILLING MODE

AIR CONDITIONER FOR VEHICLE

CROSS REFERENCE TO RELATED APPLICATION

The present application is a continuation application of International Patent Application No. PCT/JP2021/011582 filed on Mar. 22, 2021, which designated the U.S. and claims the benefit of priority from Japanese Patent Application No. 2020-080913 filed on May 1, 2020. The entire disclosures of all of the above applications are incorporated herein by reference.

TECHNICAL FIELD

The present disclosure relates to an air conditioner for a vehicle.

BACKGROUND ART

An air conditioner heats/cools air in a cabin and adjust the temperature of in-vehicle equipment using a refrigeration cycle. The blown air having passed through the evaporator of the refrigeration cycle is heated by the heater core to air-condition the interior of the cabin.

SUMMARY

According to an aspect of the present disclosure, an air conditioner for a vehicle includes a refrigeration cycle, a heating unit and a control unit. The refrigeration cycle includes: a compressor that compresses and discharges a refrigerant; a condenser that condenses a high pressure refrigerant discharged from the compressor; an air-conditioning evaporator that evaporates a refrigerant flowing out of the condenser by heat exchange with blown air blown to a space to be air-conditioned; a chilling evaporator that evaporates a refrigerant flowing out of the condenser; an air-conditioning side flow path formed so that a refrigerant passes through the air-conditioning evaporator; a detour flow path formed so that a refrigerant is detoured around the air-conditioning evaporator; and an air-conditioning flow rate adjustment unit disposed in the air-conditioning side flow path to decompress a refrigerant flowing into the air-conditioning evaporator and adjust a flow rate of a refrigerant flowing into the air-conditioning evaporator. The heating unit is disposed downstream of the air-conditioning evaporator in a flow direction of the blown air and heats at least part of the blown air that has passed through the air-conditioning evaporator. The control unit controls an operation of at least the air-conditioning flow rate adjustment unit. The control unit includes a determination unit that determines whether a condensation condition under which condensation of a refrigerant in the air-conditioning evaporator is assumed to occur is satisfied when a refrigerant is flowing through the chilling evaporator via the detour flow path in a state where an inflow of a refrigerant into the air-conditioning evaporator is prohibited by the air-conditioning flow rate adjustment unit. The control unit controls an operation of the air-conditioning flow rate adjustment unit to allow an inflow of a refrigerant into the air-conditioning evaporator as a condensation suppression operation for suppressing condensation of a refrigerant in the air-conditioning evaporator when the determination unit determines that the condensation condition is satisfied.

BRIEF DESCRIPTION OF THE DRAWINGS

The above and other objects, features, and advantages of the present disclosure will become more apparent from the following detailed description with reference to the accompanying drawings. In the accompanying drawings.

DESCRIPTION OF EMBODIMENTS

Figure 1:
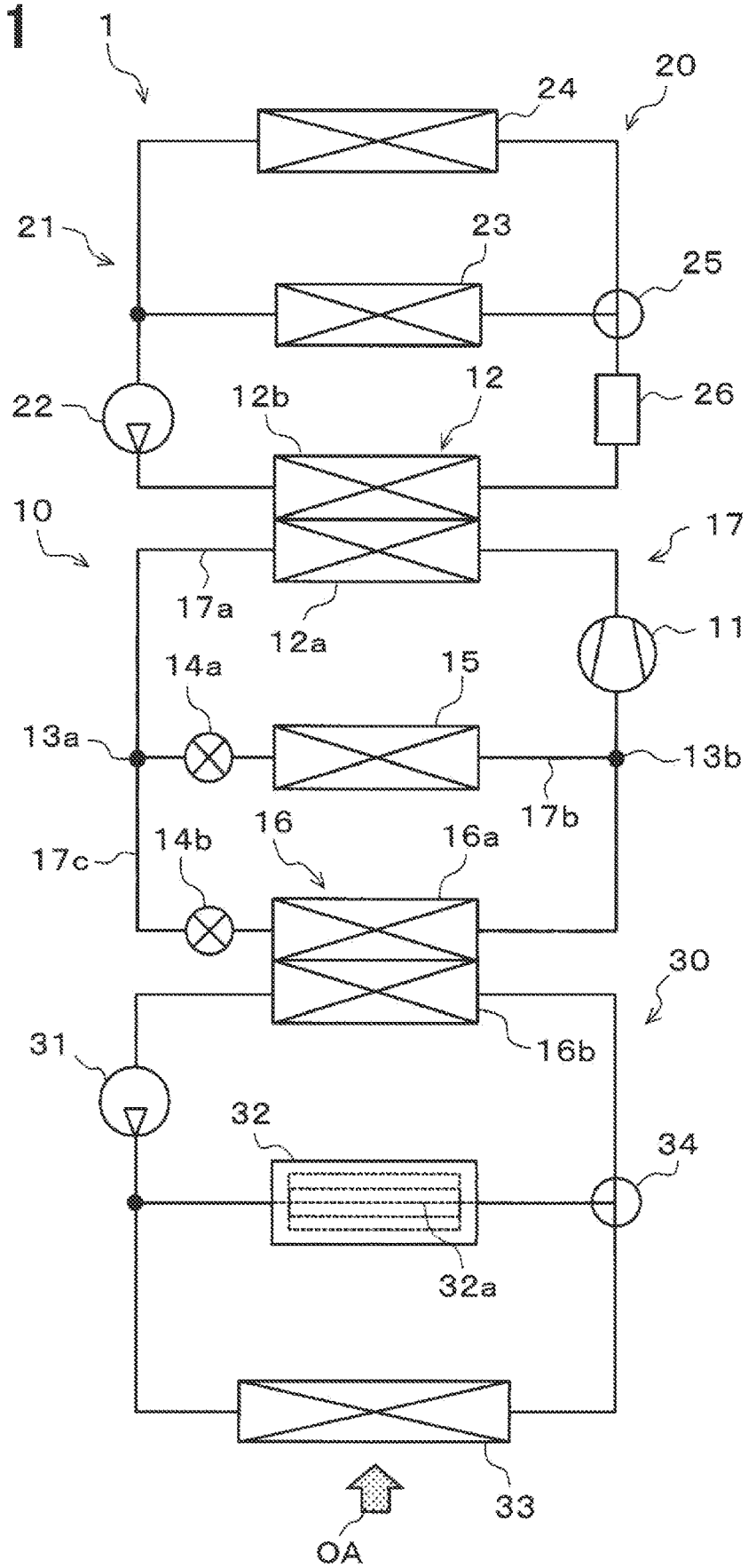
FIG. 1 is an overall configuration diagram of a vehicle air conditioner according to the first embodiment.

To begin with, examples of relevant techniques will be described. A vehicle air conditioner air-conditions the interior of the cabin and adjust the temperature of in-vehicle equipment using a refrigeration cycle. In the vehicle air conditioner, the blown air having passed through the evaporator of the refrigeration cycle is heated by the heater core to air-condition the interior of the cabin. A refrigerant-water heat exchanger of a refrigeration cycle is disposed in parallel with an evaporator, and a battery is chilled using a refrigerant and chilling water.

When the battery is chilled in a state where the evaporator is not used, there is a possibility that the refrigerant condenses and liquefaction of the refrigerant occurs in the evaporator. Depending on the relationship between the temperature of the suction air passing through the evaporator and the refrigerant temperature, the gas-phase refrigerant flows into the evaporator from the flow outlet port of the evaporator and condenses by heat exchange with the suction air.

When liquefaction of the refrigerant occurs in the evaporator, an amount of the refrigerant circulating in the refrigeration cycle is insufficient. Therefore, it is assumed that chilling performance in the refrigerant-water heat exchanger deteriorates and temperature adjustment of the battery is affected.

The present disclosure provides an air conditioner capable of suppressing condensation of a refrigerant inside an air-conditioning evaporator and ensuring chilling performance in the chilling evaporator, for a vehicle.

According to a first aspect of the present disclosure, an air conditioner for a vehicle includes a refrigeration cycle, a heating unit and a control unit. The refrigeration cycle includes a compressor, a condenser, an air-conditioning evaporator, a chilling evaporator, an air-conditioning side flow path, a detour flow path and an air-conditioning flow rate adjustment unit.

The compressor compresses and discharges a refrigerant. The condenser condenses a high pressure refrigerant discharged from the compressor. The air-conditioning evaporator evaporates a refrigerant flowing out of the condenser by heat exchange with blown air blown to a space to be air-conditioned. The chilling evaporator evaporates a refrigerant flowing out of the condenser. The air-conditioning side flow path is formed so that a refrigerant passes through the air-conditioning evaporator. The detour flow path is formed so that a refrigerant is detoured around the air-conditioning evaporator. The air-conditioning flow rate adjustment unit is disposed in the air-conditioning side flow path to decompress a refrigerant flowing into the air-conditioning evaporator and adjust a flow rate of a refrigerant flowing into the air-conditioning evaporator.

The heating unit is disposed downstream of the air-conditioning evaporator in a direction of a flow of the blown air and heats at least part of the blown air that has passed through the air-conditioning evaporator. The control unit controls an operation of at least the air-conditioning flow rate adjustment unit. The control unit includes a determination unit that determines whether a condensation condition under which condensation of a refrigerant in the air-conditioning evaporator is assumed to occur is satisfied when a refrigerant is flowing through the chilling evaporator via the detour flow path in a state where an inflow of a refrigerant into the air-conditioning evaporator is prohibited by the air-conditioning flow rate adjustment unit.

The control unit controls an operation of the air-conditioning flow rate adjustment unit to allow an inflow of a refrigerant into the air-conditioning evaporator as a condensation suppression operation for suppressing condensation of a refrigerant in the air-conditioning evaporator when the determination unit determines that the condensation condition is satisfied.

According to this aspect, as an operation mode of the refrigeration cycle, it is possible to realize an aspect in which the refrigerant flows through the chilling evaporator while the refrigerant dose not flow through the refrigerant in the air-conditioning evaporator and the blown air is heated by the heating unit. In this operation mode, the refrigerant flows through the chilling evaporator via the detour flow path in a state in which the inflow of the refrigerant into the air-conditioning evaporator is prohibited by the air-conditioning flow rate adjustment unit. Therefore, it is expected that condensation of the refrigerant and liquefaction of the refrigerant occur in the air-conditioning evaporator.

According to the vehicle air conditioner, even in such a case, the determination unit determines whether the condensation condition is satisfied, and the operation of the air-conditioning flow rate adjustment unit is controlled as the condensation suppression operation to allow the inflow of the refrigerant into the air-conditioning evaporator. As a result, a flow of the refrigerant passing through the inside of the air-conditioning evaporator is generated, so that it is possible to suppress condensation and liquefaction of the refrigerant in the air-conditioning evaporator. Furthermore, the amount of the refrigerant circulating in the refrigeration cycle can be secured by suppressing liquefaction of the refrigerant in the air-conditioning evaporator, so that the chilling performance of the chilling evaporator can be maintained.

According to a second aspect of the present disclosure, an air conditioner for a vehicle includes a refrigeration cycle, a heating unit, a suction air temperature acquisition unit, a refrigerant saturation temperature acquisition unit and a control unit. The refrigeration cycle includes a compressor, a condenser, an air-conditioning evaporator, a chilling evaporator, an air-conditioning side flow path, a detour flow path, an air-conditioning flow rate adjustment unit, and a chilling flow rate adjustment unit.

The compressor compresses and discharges a refrigerant. The condenser condenses a high pressure refrigerant discharged from the compressor. The air-conditioning evaporator evaporates a refrigerant flowing out of the condenser by heat exchange with blown air blown to a space to be air-conditioned. The chilling evaporator evaporates a refrigerant flowing out of the condenser. The air-conditioning side flow path is formed so that a refrigerant passes through the air-conditioning evaporator. The detour flow path is formed so that a refrigerant is detoured around the air-conditioning evaporator. The air-conditioning flow rate adjustment unit is disposed in the air-conditioning side flow path to decompress a refrigerant flowing into the air-conditioning evaporator and adjust a flow rate of a refrigerant flowing into the air-conditioning evaporator. The chilling flow rate adjustment unit decompresses a refrigerant flowing into the chilling evaporator and adjusts a flow rate of a refrigerant flowing into the chilling evaporator.

The heating unit is disposed downstream of the air-conditioning evaporator in a direction of a flow of the blown air and heats at least part of the blown air that has passed through the air-conditioning evaporator. The suction air temperature acquisition unit acquires a suction air temperature that is a temperature of the blown air flowing into the air-conditioning evaporator. The refrigerant saturation temperature acquisition unit acquires a refrigerant saturation temperature of a refrigerant in the air-conditioning evaporator. The control unit controls operations of at least the air-conditioning flow rate adjustment unit and the chilling flow rate adjustment unit.

The control unit includes a determination unit that determines whether a condensation condition under which condensation of a refrigerant in the air-conditioning evaporator is assumed to occur is satisfied when a refrigerant is flowing through the chilling evaporator via the detour flow path in a state where an inflow of the refrigerant into the air-conditioning evaporator is prohibited by the air-conditioning flow rate adjustment unit.

The control unit adjusts an amount of pressure reduction in the chilling flow rate adjustment unit so that the refrigerant saturation temperature is lower than the suction air temperature as a condensation suppression operation for suppressing condensation of a refrigerant in the air-conditioning evaporator when the determination unit determines that the condensation condition is satisfied.

According to this aspect, as an operation mode of the refrigeration cycle, it is possible to realize an aspect in which the refrigerant flows through the chilling evaporator while the refrigerant dose not flow through the refrigerant in the air-conditioning evaporator and the blown air is heated by the heating unit. In this operation mode, the refrigerant flows through the chilling evaporator via the detour flow path in a state in which the inflow of the refrigerant into the air-conditioning evaporator is prohibited by the air-conditioning flow rate adjustment unit. Therefore, it is expected that condensation of the refrigerant and liquefaction of the refrigerant occur in the air-conditioning evaporator.

According to the vehicle air conditioner, even in such a case, the determination unit determines whether the condensation condition is satisfied, and the amount of pressure reduction in the chilling flow rate adjustment unit is adjusted so that the refrigerant saturation temperature is lower than the suction air temperature as the condensation suppression operation. As a result, the refrigerant saturation temperature inside the air-conditioning evaporator is lower than the suction air temperature, so that condensation and liquefaction of the refrigerant in the air-conditioning evaporator can be suppressed. Furthermore, the amount of the refrigerant circulating in the refrigeration cycle can be secured by suppressing liquefaction of the refrigerant in the air-conditioning evaporator, so that the chilling performance of the chilling evaporator can be maintained.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

First, a first embodiment of the present disclosure will be described with reference to FIGS. 1 to 8. In the first embodiment, a vehicle air conditioner 1 according to the present disclosure is applied to a vehicle air conditioner for an electric vehicle that obtains a driving force for vehicle traveling from a traveling electric motor. The vehicle air conditioner 1 air-conditions the interior of the cabin which is a space to be air-conditioned and adjusts the temperature of a battery B as a heat generating device in an electric vehicle.

The vehicle air conditioner 1 can switch between a cooling mode, a heating mode, and a dehumidifying/heating mode as an air-conditioning operation mode for air-conditioning the interior of the cabin. The cooling mode is an operation mode in which the blown air blown into the cabin is chilled and blown into the cabin. The heating mode is an operation mode in which the blown air is heated and blown into the cabin. The dehumidifying/heating mode is an operation mode in which dehumidifying and heating the interior of the cabin is performed by reheating the chilled and dehumidified blown air and blowing the heated air into the cabin.

The vehicle air conditioner 1 can switch the presence or absence of chilling of the battery B regardless of the state of the air-conditioning operation mode. Therefore, the operation mode of the vehicle air conditioner 1 can be defined by a combination of the state of the air-conditioning operation mode and the presence or absence of chilling of the battery B. Accordingly, the operation mode of the vehicle air conditioner 1 includes seven operation modes including a cooling mode, a heating mode, a dehumidifying/heating mode, a single chilling mode, a chilling/cooling mode, a chilling/heating mode, and a chilling/dehumidifying/heating mode.

The single chilling mode is an operation mode for chilling the battery B without air-conditioning the interior of the cabin. The chilling/cooling mode is an operation mode for cooling the interior of the cabin and chilling the battery B. The chilling/heating mode is an operation mode for heating the interior of the cabin and chilling the battery B. The chilling/dehumidifying/heating mode is an operation mode for dehumidifying/heating the interior of the cabin and chilling the battery B.

In a refrigeration cycle 10 of the vehicle air conditioner 1, an HFC refrigerant (specifically, R134a) is used as the refrigerant to constitute a subcritical refrigeration cycle in which the high-pressure side refrigerant pressure does not exceed the critical pressure of the refrigerant. Refrigerating machine oil for lubricating a compressor 11 is mixed in the refrigerant. An example of the refrigerating machine oil includes a PAG oil (polyalkylene glycol oil) having compatibility with a liquid-phase refrigerant. Part of the refrigerating machine oil circulates in the cycle together with the refrigerant.

Next, a specific configuration of the vehicle air conditioner 1 according to the first embodiment will be described with reference to FIGS. 1 to 3. The vehicle air conditioner 1 according to the first embodiment includes the refrigeration cycle 10, a heating unit 20, a low-temperature side heat medium circuit 30, an interior air-conditioning unit 40, and a control device 50.

First, components constituting the refrigeration cycle 10 in the vehicle air conditioner 1 will be described. The refrigeration cycle 10 is a vapor compression refrigeration cycle device. First, the compressor 11 sucks, compresses, and discharges the refrigerant in the refrigeration cycle 10. The compressor 11 is disposed in a vehicle hood.

The compressor 11 is an electric compressor in which a fixed capacity type compression mechanism having a fixed discharge capacity is rotationally driven by an electric motor. The rotation speed (that is, refrigerant discharge capacity) of the compressor 11 is controlled by a control signal output from a control device 50 described later.

The inlet of a refrigerant passage 12a of a heat medium refrigerant heat exchanger 12 is connected to the discharge port of the compressor 11. The heat medium refrigerant heat exchanger 12 is a heat exchanger that radiates heat of the high pressure refrigerant discharged from the compressor 11 to the high-temperature side heat medium circulating in the high-temperature side heat medium circuit 21 of the heating unit 20 to heat the high-temperature side heat medium.

The heat medium refrigerant heat exchanger 12 includes the refrigerant passage 12a through which the refrigerant of the refrigeration cycle 10 flows, and a heat medium passage 12b through which the high-temperature side heat medium of the high-temperature side heat medium circuit 21 flows. The heat medium refrigerant heat exchanger 12 is formed of the same kind of metal (in the first embodiment, an aluminum alloy) having excellent heat conductivity, and the respective constituent members are integrated by brazing.

Accordingly, the high pressure refrigerant flowing through the refrigerant passage 12a and the high-temperature side heat medium flowing through the heat medium passage 12b can exchange heat with each other. The heat medium refrigerant heat exchanger 12 is an example of a condenser that radiates heat of the high pressure refrigerant, and constitutes part of a heating unit 20 described later.

A branch portion 13a having a three-way joint structure is connected to the outlet of the refrigerant passage 12a of the heat medium refrigerant heat exchanger 12. The branch portion 13a branches the flow of the liquid-phase refrigerant flowing out of the heat medium refrigerant heat exchanger 12. The branch portion 13a has one of the three flow inlet/outlet ports as a refrigerant flow inlet port, and the remaining two as refrigerant flow outlet ports.

The refrigerant inlet of the air-conditioning evaporator 15 is connected to one refrigerant flow outlet port of the branch portion 13a via the first expansion valve 14a. The refrigerant inlet of the chiller 16 is connected to the other refrigerant flow outlet port of the refrigerant branch portion via the second expansion valve 14b.

The first expansion valve 14a is a decompression unit that decompresses the refrigerant flowing out of the one refrigerant flow outlet port of the branch portion 13a at least in an operation mode of chilling the blown air. The first expansion valve 14a is an electric variable throttle mechanism, and includes a valve body and an electric actuator. That is, the first expansion valve 14a is configured by a so-called electric expansion valve.

The valve body of the first expansion valve 14a is configured to be able to change a passage opening degree (in other words, a throttle opening degree) of the refrigerant passage. The electric actuator includes a stepping motor that changes the throttle opening degree of the valve body. The operation of the first expansion valve 14a is controlled by a control signal output from the control device 50.

The first expansion valve 14a includes a variable throttle mechanism having a full-open function of fully opening the refrigerant passage when the throttle opening degree is fully opened and a full-close function of closing the refrigerant passage when the throttle opening degree is fully closed. That is, the first expansion valve 14a can prevent the refrigerant from exerting the decompressing action by fully opening the refrigerant passage.

The first expansion valve 14a closes the refrigerant passage to block the inflow of the refrigerant into the air-conditioning evaporator 15. That is, the first expansion valve 14a has both a function as a decompression unit that decompresses the refrigerant and a function as a refrigerant circuit switching unit that switches the refrigerant circuit. The first expansion valve 14a can adjust the flow rate of the refrigerant flowing into the air-conditioning evaporator 15 by adjusting the throttle opening degree of the refrigerant passage. Therefore, the first expansion valve 14a corresponds to an example of an air-conditioning flow rate adjustment unit.

The refrigerant inlet of the air-conditioning evaporator 15 is connected to the outlet of the first expansion valve 14a. As illustrated in FIG. 2, the air-conditioning evaporator 15 is disposed in a casing 41 of the interior air-conditioning unit 40. The air-conditioning evaporator 15 is an evaporator that exchanges heat between the low pressure refrigerant decompressed by the first expansion valve 14a and blown air W to evaporate the low pressure refrigerant and chill the blown air W at least in the operation mode of chilling the blown air.

As illustrated in FIG. 1, the second expansion valve 14b is connected to the other refrigerant flow outlet port of the branch portion 13a. The second expansion valve 14b is a decompression unit that decompresses the refrigerant flowing out of the other refrigerant flow outlet port of the branch portion 13a at least in the heating mode.

As in the first expansion valve 14a, the second expansion valve 14b is an electric variable throttle mechanism, and includes a valve body and an electric actuator. That is, the second expansion valve 14b is configured by a so-called electric expansion valve, and has a full-open function and a full-close function.

That is, the second expansion valve 14b can prevent the refrigerant from exerting the decompressing action by fully opening the refrigerant passage. The second expansion valve 14b closes the refrigerant passage to block the inflow of the refrigerant into the chiller 16. That is, the second expansion valve 14b has both a function as a decompression unit that decompresses the refrigerant and a function as a refrigerant circuit switching unit that switches the refrigerant circuit. The second expansion valve 14b is an example of a chilling flow rate adjustment unit.

The refrigerant inlet of the chiller 16 is connected to the outlet of the second expansion valve 14b. The chiller 16 is a heat exchanger that exchanges heat between the low pressure refrigerant decompressed by the second expansion valve 14b and the low-temperature side heat medium circulating in the low-temperature side heat medium circuit 30.

The chiller 16 includes a refrigerant passage 16a through which the low pressure refrigerant decompressed by the second expansion valve 14b flows, and a heat medium passage 16b through which the low-temperature side heat medium circulating in the low-temperature side heat medium circuit 30 flows. Therefore, the chiller 16 is an evaporator that evaporates the low pressure refrigerant by heat exchange between the low pressure refrigerant flowing through the refrigerant passage 16a and the low-temperature side heat medium flowing through the heat medium passage 16b to absorb heat from the low-temperature side heat medium. That is, the chiller 16 corresponds to an example of a chilling evaporator, and the second expansion valve 14b corresponds to an example of a chilling decompression unit.

As shown in FIG. 1, one refrigerant inlet of a merging portion 13b is connected to the refrigerant outlet of the air-conditioning evaporator 15. The other refrigerant inlet of the merging portion 13b is connected to the refrigerant outlet of the chiller 16. Here, as in the branch portion 13a, the merging portion 13b has a three-way joint structure, and has two of the three flow inlet/outlet ports as refrigerant inlets and the remaining one as the refrigerant outlet.

Accordingly, the merging portion 13b merges the flow of the refrigerant flowing out of the air-conditioning evaporator 15 and the flow of the refrigerant flowing out of the chiller 16. The suction port of the compressor 11 is connected to the refrigerant outlet of the merging portion 13b.

In the refrigeration cycle 10 according to the first embodiment, the compressor 11, the heat medium refrigerant heat exchanger 12, the first expansion valve 14a, the second expansion valve 14b, the air-conditioning evaporator 15, and the chiller 16 are connected via a refrigerant circulation flow path 17. As illustrated in FIG. 1, the refrigerant circulation flow path 17 includes a common flow path 17a, a through flow path 17b, and a detour flow path 17c.

The common flow path 17a is a portion through which the refrigerant flows in common in any path in the refrigerant circulation flow path 17. The common flow path 17a of the first embodiment is a refrigerant flow path connecting the refrigerant outlet of the merging portion 13b and the refrigerant inlet of the branch portion 13a. Therefore, the compressor 11 and the heat medium refrigerant heat exchanger 12 are disposed in the common flow path 17a of the first embodiment.

The through flow path 17b is a portion, of the refrigerant circulation flow path 17 in the refrigeration cycle 10, through which the refrigerant flows via the air-conditioning evaporator 15, and corresponds to an example of an air-conditioning side flow path. The through flow path 17b in the first embodiment is a refrigerant flow path that connects one refrigerant flow outlet port of the branch portion 13a and one refrigerant inlet of the merging portion 13b. Accordingly, the first expansion valve 14a and the air-conditioning evaporator 15 are disposed in the through flow path 17b of the first embodiment.

The detour flow path 17c is a portion, of the refrigerant circulation flow path 17 in the refrigeration cycle 10, through which the refrigerant flows so as to detour around the air-conditioning evaporator 15. The detour flow path 17c in the first embodiment is a refrigerant flow path that connects the other refrigerant flow outlet port of the branch portion 13a and the other refrigerant inlet of the merging portion 13b. Therefore, the second expansion valve 14b and the refrigerant passage 16a of the chiller 16 are disposed in the detour flow path 17c of the first embodiment.

The refrigeration cycle 10 according to the first embodiment can have two circulation paths including a circulation path through which the refrigerant circulates via the common flow path 17a and the through flow path 17b and a circulation path through which the refrigerant circulates via the common flow path 17a and the detour flow path 17c.

Next, the heating unit 20 in the vehicle air conditioner 1 will be described. The heating unit 20 is configured to heat the blown air W supplied to a space to be air-conditioned using the high pressure refrigerant in the refrigeration cycle 10 as a heat source.

The heating unit 20 according to the first embodiment includes a high-temperature side heat medium circuit 21. The high-temperature side heat medium circuit 21 is a heat medium circuit that circulates the high-temperature side heat medium, and a solution containing ethylene glycol, an antifreeze liquid, or the like can be used as the high-temperature side heat medium.

As shown in FIG. 1, in the high-temperature side heat medium circuit 21, the heat medium passage 12b of the heat medium refrigerant heat exchanger 12, a high-temperature pump 22, a heater core 23, a radiator 24, a high-temperature flow rate adjustment valve 25, an electric heater 26, and the like are disposed.

As described above, in the heat medium passage 12b of the heat medium refrigerant heat exchanger 12, the high-temperature side heat medium is heated by heat exchange with the high pressure refrigerant flowing through the refrigerant passage 12a. That is, the high-temperature side heat medium is heated using the heat pumped up by the refrigeration cycle 10.

The discharge port of the high-temperature pump 22 is connected to the inlet of the heat medium passage 12b of the heat medium refrigerant heat exchanger 12. The high-temperature pump 22 is a heat medium pump that pumps the high-temperature side heat medium in order to circulate the high-temperature side heat medium in the high-temperature side heat medium circuit 21. The high-temperature pump 22 is an electric pump whose rotation speed (that is, pressure feeding capability) is controlled by a control voltage output from the control device 50.

The electric heater 26 is connected to the outlet of the heat medium passage 12b of the heat medium refrigerant heat exchanger 12. The electric heater 26 is a heating device that generates heat by being supplied with electric power and heats the high-temperature side heat medium flowing through the heat medium passage of the electric heater 26.

The electric heater 26, for example can include a PTC heater having a PTC element (that is, the positive characteristic thermistor). The electric heater 26 can adjust the amount of heat for heating the high-temperature side heat medium by the control voltage output from the control device 50.

The flow inlet port of the high-temperature flow rate adjustment valve 25 is connected to the outlet of the heat medium passage in the electric heater 26. The high-temperature flow rate adjustment valve 25 is configured by an electric three-way flow rate regulating valve having three flow inlet/outlet ports.

One flow outlet port of the high-temperature flow rate adjustment valve 25 is connected to the flow inlet port of the heater core 23. The heater core 23 is a heat exchanger that exchanges heat between the high-temperature side heat medium heated by the heat medium refrigerant heat exchanger 12 and the like and the blown air W having passed through the air-conditioning evaporator 15 to heat the blown air W. As illustrated in FIGS. 1 and 2, the heater core 23 is disposed in the casing 41 of the interior air-conditioning unit 40.

The flow inlet port of the radiator 24 is connected to the other flow outlet port of the high-temperature flow rate adjustment valve 25. The radiator 24 is a heat exchanger that exchanges heat between the high-temperature side heat medium heated by the heat medium refrigerant heat exchanger 12 and the like and outside air OA blown from an outside air fan (not illustrated) to dissipate heat of the high-temperature side heat medium to the outside air OA.

The radiator 24 is disposed on the front side in the vehicle hood. With the operation of the outside air fan described above, the outside air OA flows from the front side to the rear side of the vehicle and passes through the heat exchange unit of the radiator 24. During traveling of the vehicle, traveling wind can be applied to the radiator 24 from the front side toward the rear side of the vehicle.

The high-temperature side merging portion of the three-way joint structure is connected to the flow outlet port of the radiator 24 and the flow outlet port of the heater core 23. The high-temperature side merging portion has one of three flow inlet/outlet ports in the three-way joint structure as a flow outlet port, and the remaining two as flow inlet ports. Therefore, the merging portion can merge the flow of the high-temperature side heat medium passing through the radiator 24 and the flow of the high-temperature side heat medium passing through the heater core 23. The suction port of the high-temperature pump 22 is connected to the flow outlet port of the high-temperature side merging portion.

As described above, in the high-temperature side heat medium circuit 21 of the first embodiment, the radiator 24 and the heater core 23 are connected in parallel with respect to the flow of the high-temperature side heat medium passing through the heat medium passage 12b of the heat medium refrigerant heat exchanger 12. The high-temperature flow rate adjustment valve 25 can continuously adjust the flow rate ratio between the flow rate of the high-temperature side heat medium flowing into the heater core 23 and the flow rate of the high-temperature side heat medium flowing into the radiator 24 in the high-temperature side heat medium circuit 21.

That is, by controlling the operation of the high-temperature flow rate adjustment valve 25, the amount of heat of the high-temperature side heat medium dissipated to the outside air OA in the radiator 24 and the amount of heat of the high-temperature side heat medium dissipated to the blown air W in the heater core 23 can be adjusted.

Next, the low-temperature side heat medium circuit 30 in the vehicle air conditioner 1 will be described. The low-temperature side heat medium circuit 30 is a heat medium circuit that circulates the low-temperature side heat medium. The low-temperature side heat medium can include a fluid same as the high-temperature side heat medium in the high-temperature side heat medium circuit 21.

In the low-temperature side heat medium circuit 30, the heat medium passage 16b of the chiller 16, a low-temperature pump 31, a device heat exchange unit 32, an outside air heat exchanger 33, a low-temperature flow rate adjustment valve 34, and the like are disposed. The suction port of the low-temperature pump 31 is connected to the flow outlet port of the heat medium passage 16b in the chiller 16.

The low-temperature pump 31 is a heat medium pump that pumps the low-temperature side heat medium having passed through the heat medium passage 16b of the chiller 16 in the low-temperature side heat medium circuit 30. The basic configuration of the low-temperature pump 31 is similar to that of the high-temperature pump 22.

The branch portion of the three-way joint structure is connected to the discharge port of the low-temperature pump 31. The branch portion has one of three flow inlet/outlet ports in the three-way joint structure as a flow inlet port, and the remaining two as flow outlet ports. Therefore, the branch portion can branch the flow of the low-temperature side heat medium pumped from the low-temperature pump 31 into two flows.

The inlet of a heat medium passage 32a in the device heat exchange unit 32 is connected to one flow outlet port of the branch portion of the low-temperature side heat medium circuit 30. Here, in the vehicle air conditioner 1, the low-temperature side heat medium is caused to pass through the heat medium passage 32a of the device heat exchange unit 32 for heat exchange, whereby the heat generated in the battery B is absorbed by the low-temperature side heat medium to adjust the temperature of the battery B. That is, the device heat exchange unit 32 is connected to be chilled by the low-temperature side heat medium in the low-temperature side heat medium circuit 30, and is configured to maintain the temperature of the battery B within a predetermined temperature range.

Figure 3:
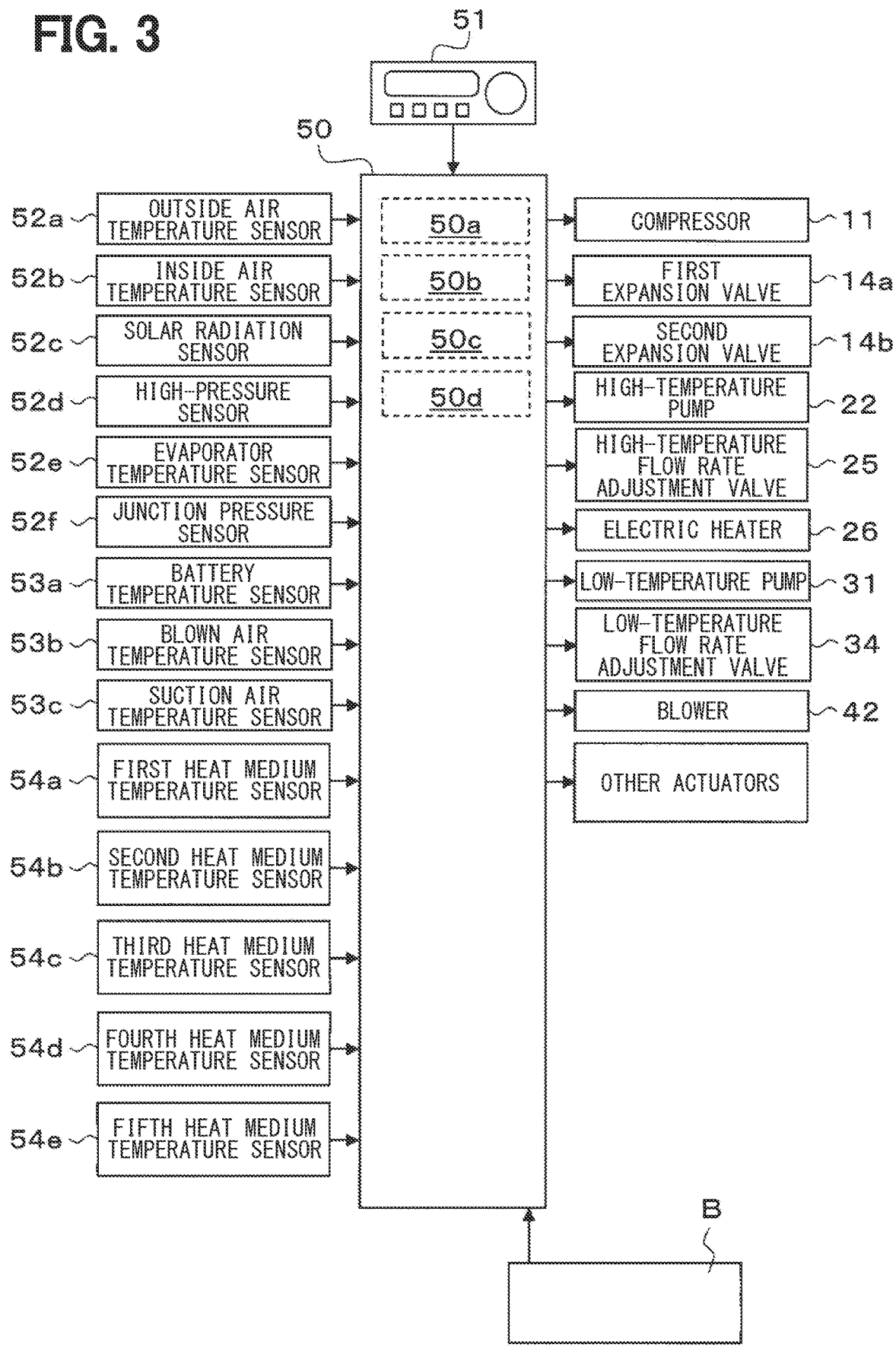
FIG. 3 is a block diagram illustrating a control system of the vehicle air conditioner according to the first embodiment.

As illustrated in FIG. 3, the battery B supplies electric power to various electric devices of the vehicle, and for example, a chargeable/dischargeable secondary battery (in the present embodiment, a lithium-ion battery) is used. Since the battery B generates heat at the time of charging and discharging, the battery B corresponds to an example of a heat generating device.

The battery B is a so-called assembled battery formed by stacking and disposing a plurality of battery cells and electrically connecting these battery cells in series or in parallel. This type of battery B is likely to decrease in output at a low temperature, and is likely to deteriorate at a high temperature. Therefore, the temperature of the battery B is required to be maintained within an appropriate temperature range (for example, 10° C. or higher and 40° C. or lower) in which the charge/discharge capacity of the battery B can be sufficiently utilized. Therefore, in the vehicle air conditioner 1, the temperature of the battery B is appropriately adjusted by controlling the flow rate or the like of the low-temperature side heat medium.

The inlet of the outside air heat exchanger 33 is connected to the other flow outlet port of the branch portion of the low-temperature side heat medium circuit 30. The outside air heat exchanger 33 is a heat exchanger that exchanges heat between the low-temperature side heat medium discharged from the low-temperature pump 31 and the outside air OA blown by an outside air fan (not illustrated).

The outside air heat exchanger 33 is disposed on the front side in the drive device chamber. Therefore, when the vehicle travels, the traveling wind can be applied to the outside air heat exchanger 33. Therefore, the outside air heat exchanger 33 may be formed integrally with the radiator 24 and the like.

As illustrated in FIG. 1, the low-temperature flow rate adjustment valve 34 is connected to the outlet of the heat medium passage 32a of the device heat exchange unit 32 and the flow outlet port of the outside air heat exchanger 33. The low-temperature flow rate adjustment valve 34 is configured by an electric three-way flow rate regulating valve having three flow inlet/outlet ports.

That is, the outlet of the heat medium passage 32a of the device heat exchange unit 32 is connected to one flow inlet port of the low-temperature flow rate adjustment valve 34, and the flow outlet port of the outside air heat exchanger 33 is connected to the other flow inlet port of the low-temperature flow rate adjustment valve 34. The flow inlet port of the heat medium passage 16b in the chiller 16 is connected to the flow outlet port of the low-temperature flow rate adjustment valve 34.

Therefore, the low-temperature flow rate adjustment valve 34 can continuously adjust the flow rate ratio between the flow rate of the low-temperature side heat medium passing through the outside air heat exchanger 33 and the flow rate of the low-temperature side heat medium passing through the device heat exchange unit 32 with respect to the flow of the low-temperature side heat medium passing through the heat medium passage 16b of the chiller 16. That is, the low-temperature side heat medium circuit 30 can switch the flow of the low-temperature side heat medium by controlling the operation of the low-temperature flow rate adjustment valve 34.

For example, in the low-temperature side heat medium circuit 30, the low-temperature flow rate adjustment valve 34 can be controlled so that the flow inlet/outlet ports of the chiller 16 communicates with the flow inlet/outlet ports of the device heat exchange unit 32, and the flow inlet/outlet ports of the outside air heat exchanger 33 is closed. In this case, the flow of the low-temperature side heat medium is switched so that the entire amount of the low-temperature side heat medium having passed through the chiller 16 passes through the heat medium passage 32a of the device heat exchange unit 32.

According to this aspect, since the low-temperature side heat medium chilled by the chiller 16 can be supplied to the device heat exchange unit 32, the battery B can be chilled. In other words, the low pressure refrigerant in the refrigeration cycle 10 can absorb the waste heat of the battery B absorbed as the battery B is chilled by heat exchange in the chiller 16.

In addition, in the low-temperature side heat medium circuit 30, the low-temperature flow rate adjustment valve 34 can be controlled so that the flow inlet/outlet ports of the chiller 16 communicates with the flow inlet/outlet ports of the outside air heat exchanger 33, and the flow inlet/outlet port of the device heat exchange unit 32 is closed. In this case, the flow of the low-temperature side heat medium is switched so that the entire amount of the low-temperature side heat medium having passed through the chiller 16 passes through the outside air heat exchanger 33.

According to this aspect, since the low-temperature side heat medium chilled by the chiller 16 can be supplied to the outside air heat exchanger 33, when the temperature of the low-temperature side heat medium is lower than the outside air temperature, heat can be absorbed from the outside air OA. Accordingly, the outside air OA can be used as a heat source for heating the blown air.

That is, the vehicle air conditioner 1 can chill the battery B and adjust the temperature thereof by using the low-temperature side heat medium circuit 30. The vehicle air conditioner 1 can use the outside air OA as a heat source by using the outside air heat exchanger 33.

Next, the interior air-conditioning unit 40 constituting the vehicle air conditioner 1 will be described with reference to FIG. 2. The interior air-conditioning unit 40 is a unit for blowing the blown air W whose temperature has been adjusted by the refrigeration cycle 10 to an appropriate location in the cabin in the vehicle air conditioner 1. The interior air-conditioning unit 40 is disposed inside an instrument panel at the foremost part of the interior of the cabin.

The interior air-conditioning unit 40 accommodates a blower 42, the air-conditioning evaporator 15, the heater core 23, and the like in the air passage formed in the casing 41 forming an outer shell thereof. The casing 41 forms an air passage for the blown air W blown into the cabin. The casing 41 is made of resin (specifically, polypropylene) having a certain degree of elasticity and excellent strength.

Figure 2:
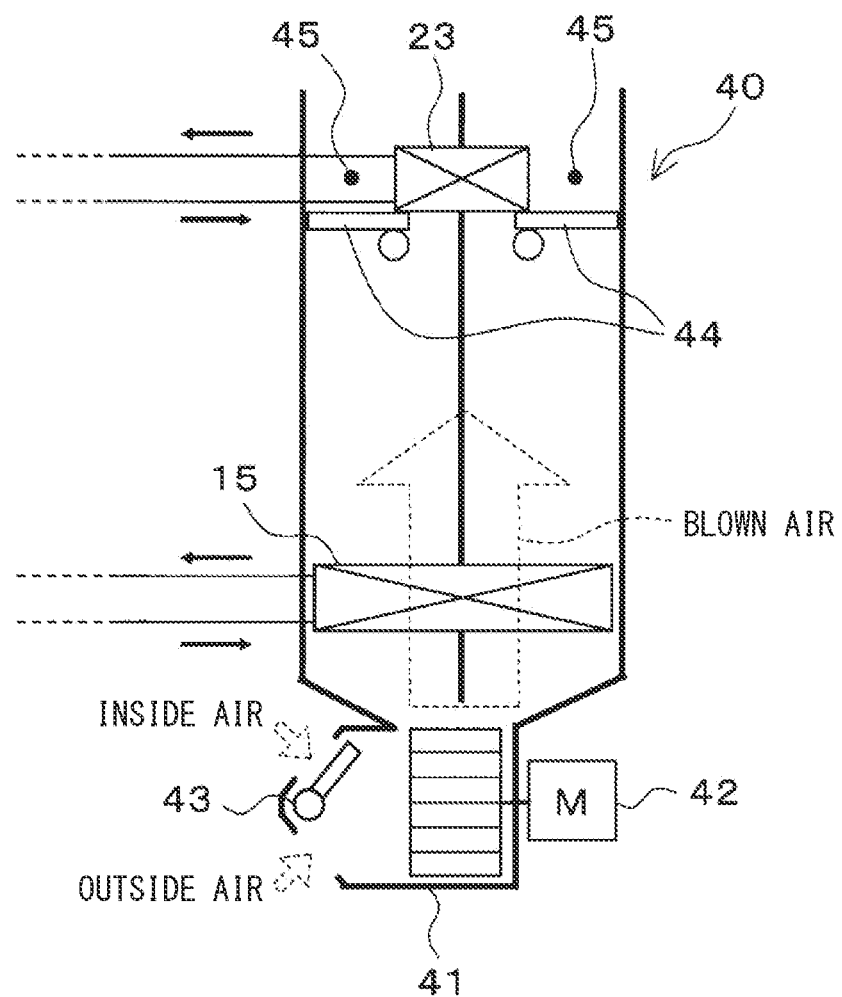
FIG. 2 is a configuration diagram of the interior air-conditioning unit according to the first embodiment.

As illustrated in FIG. 2, an inside/outside air switch device 43 is disposed on the most upstream side of the casing 41 in the blown air flow direction. The inside/outside air switch device 43 switches between inside air (air inside the cabin) and outside air (air outside the cabin) to introduce the air into the casing 41.

The inside/outside air switch device 43 continuously adjusts the opening areas of the inside air introduction port for introducing the inside air into the casing 41 and the outside air introduction port for introducing the outside air by the inside/outside air switch door to change the introduction ratio between the introduction air volume of the inside air and the introduction air volume of the outside air. The inside/outside air switch door is driven by an electric actuator for the inside/outside air switch door. The operation of the electric actuator is controlled by a control signal output from the control device 50.

The blower 42 is disposed downstream of the inside/outside air switch device 43 in the blown air flow direction. The blower 42 is configured by an electric blower that drives a centrifugal multi-blade fan with an electric motor. The blower 42 blows air sucked through the inside/outside air switch device 43 into the cabin. The rotation speed (that is, blowing capacity) of the blower 42 is controlled by a control voltage output from the control device 50.

The air-conditioning evaporator 15 and the heater core 23 are disposed in this order with respect to the flow of the blown air downstream of the blower 42 in the blown air flow direction. That is, the air-conditioning evaporator 15 is disposed upstream of the heater core 23 in the blown air flow direction. Therefore, in the interior air-conditioning unit 40 of the vehicle air conditioner 1, at least part of the blown air having passed through the air-conditioning evaporator 15 can be heated by the heater core 23.

A cold air bypass passage 45 is formed in the casing 41. The cold air bypass passage 45 is an air passage through which the blown air W having passed through the air-conditioning evaporator 15 flows downstream while detouring around the heater core 23.

An air mixing door 44 is disposed downstream of the air-conditioning evaporator 15 in the blown air flow direction and upstream of the heater core 23 in the blown air flow direction. The air mixing door 44 adjusts the air volume ratio between a volume of air passing through the heater core 23 and a volume of air passing through the cold air bypass passage 45 of the blown air W having passed through the air-conditioning evaporator 15.

The air mixing door 44 is driven by an electric actuator for driving the air mixing door. The operation of the electric actuator is controlled by a control signal output from the control device 50.

A mixing space is provided downstream of the heater core 23 in the blown air flow direction. In the mixing space, the blown air W heated by the heater core 23 and the blown air W passing through the cold air bypass passage 45 and not heated by the heater core 23 are mixed.

Further, an opening hole through which blown air (air-conditioned air) mixed in the mixing space is blown into the cabin is disposed in most downstream portion of the casing 41 in the blown air flow direction. As the opening holes, a face opening hole, a foot opening hole, and a defroster opening hole (none of them illustrated) are provided.

The face opening hole is an opening hole for blowing air-conditioned air toward the upper body of the occupant in the cabin. The foot opening hole is an open hole for blowing air-conditioned air toward the feet of the occupant. The defroster opening hole is an opening hole for blowing conditioned air toward the inner face of the windshield.

The face opening hole, the foot opening hole, and the defroster opening hole are connected to a face blow-out port, a foot blow-out port, and a defroster blow-out port (none of them illustrated) provided in the cabin via ducts forming air passages, respectively.

Therefore, the temperature of the air-conditioned air mixed in a mixing space 46 is adjusted by the air mixing door 44 adjusting the air volume ratio between the volume of air passing through the heater core 23 and the volume of air passing through the cold air bypass passage 45. As a result, the temperature of the blown air (air-conditioned air) blown into the cabin from each of the blow-out ports is adjusted.

A face door, a foot door, and a defroster door (none of them illustrated) are disposed upstream of the face opening hole, the foot opening hole, and the defroster opening hole in the blown air flow direction, respectively. The face door adjusts an opening area of the face opening hole. The foot door adjusts an opening area of the foot opening hole. The defroster door adjusts an opening area of the defroster opening hole.

The face door, the foot door, and the defroster door constitute a blow-out mode switch device that switches a blow-out port through which air-conditioned air is blown. The face door, the foot door, and the defroster door are connected to an electric actuator for driving the blow-out port mode door via a link mechanism or the like and rotated in conjunction therewith. The operation of the electric actuator is controlled by a control signal output from the control device 50.

Next, a control system of the vehicle air conditioner 1 according to the first embodiment will be described with reference to FIG. 3. The control device 50 includes a known microcomputer including a CPU, a ROM, a RAM, and the like, and the peripheral circuit thereof.

The control device 50 performs various calculations and processes based on the control program stored in the ROM, and controls the operations of various devices to be controlled connected to the output ports thereof. Therefore, the control device 50 corresponds to an example of a control unit.

The devices to be controlled include the compressor 11, the first expansion valve 14a, the second expansion valve 14b, the high-temperature pump 22, the high-temperature flow rate adjustment valve 25, the electric heater 26, the low-temperature pump 31, the low-temperature flow rate adjustment valve 34, the blower 42, and the like.

As illustrated in FIG. 3, a control sensor group for controlling the operation of the device to be controlled is connected to the input of the control device 50. The control sensor group includes an inside air temperature sensor 52a, an outside air temperature sensor 52b, a solar radiation sensor 52c, a high pressure sensor 52d, an evaporator temperature sensor 52e, and a junction pressure sensor 52f.

The inside air temperature sensor 52a is an inside air temperature detection unit that detects a cabin interior temperature (inside air temperature) Tr. The outside air temperature sensor 52b is an outside air temperature detection unit that detects a vehicle exterior temperature (outside air temperature) Tam. The solar radiation sensor 52c is a solar radiation amount detection unit that detects a solar radiation amount As with which the interior of the cabin is irradiated. The high pressure sensor 52d is a refrigerant pressure detection unit that detects a high pressure refrigerant pressure Pd in the refrigerant flow path from the discharge port of the compressor 11 to the inlet of the first expansion valve 14a or the second expansion valve 14b.

The evaporator temperature sensor 52e is an evaporator temperature detection unit that detects a refrigerant evaporating temperature (evaporator temperature) Tefin in the air-conditioning evaporator 15. The junction pressure sensor 52f is a refrigerant pressure detection unit that detects the refrigerant pressure at the merging portion 13b of the refrigeration cycle 10. Since the merging portion pressure indicates the low pressure side refrigerant pressure of the refrigeration cycle 10, the saturation temperature calculated based on this pressure is referred to when the refrigerant saturation temperature inside the air-conditioning evaporator 15 is acquired. Accordingly, the junction pressure sensor 52f constitutes part of the refrigerant saturation temperature acquisition unit.

Further, the control sensor group includes a battery temperature sensor 53a, a blown air temperature sensor 53b, and a suction air temperature sensor 53c. The battery temperature sensor 53a is a battery temperature detection unit that detects a battery temperature TBA that is the temperature of the battery B.

The battery temperature sensor 53a includes a plurality of temperature detection units, and detects temperatures at a plurality of locations of the battery B. Therefore, the control device 50 can also detect a temperature difference between respective units of the battery B. Furthermore, the battery temperature TBA is an average value of detection values by a plurality of temperature detection units.

The blown air temperature sensor 53b is a blown air temperature detection unit that detects a blown air temperature TAV blown into the cabin. The suction air temperature sensor 53c is a suction air temperature detection unit that detects a suction air temperature that is the temperature of the blown air flowing into the air-conditioning evaporator 15. The suction air temperature sensor 53c is disposed upstream of the air-conditioning evaporator 15 in the blown air flow direction inside the casing 41 of the interior air-conditioning unit 40. The suction air temperature sensor 53c corresponds to an example of a suction air temperature acquisition unit.

A plurality of heat medium temperature sensors is connected to the input of the control device 50 in order to detect the temperature of the heat medium in each heat medium circuit of the high-temperature side heat medium circuit 21 and the low-temperature side heat medium circuit 30. The plurality of heat medium temperature sensors includes a first heat medium temperature sensor 54a to a fifth heat medium temperature sensor 54e.

The first heat medium temperature sensor 54a is disposed at the outlet portion of the heat medium passage of the electric heater 26, and detects the temperature of the high-temperature side heat medium flowing out of the electric heater 26. The second heat medium temperature sensor 54b is disposed at the outlet portion of the radiator 24, and detects the temperature of the high-temperature side heat medium that has passed through the radiator 24. The third heat medium temperature sensor 54c is disposed at the inlet portion of the heater core 23, and detects the temperature of the high-temperature side heat medium flowing into the heater core 23.

The fourth heat medium temperature sensor 54d is disposed at the outlet portion of the heat medium passage 16b of the chiller 16, and detects the temperature of the low-temperature side heat medium lowing out of the chiller 16. The fourth heat medium temperature sensor 54d corresponds to an example of a heat medium temperature acquisition unit. The fifth heat medium temperature sensor 54e is disposed at the outlet portion of the heat medium passage 32a of the device heat exchange unit 32, and detects the temperature of the low-temperature side heat medium lowing out of the heat medium passage 32a of the device heat exchange unit 32. Detection signals of the control sensor group are input to the control device 50.

The vehicle air conditioner 1 refers to the detection results by the first heat medium temperature sensor 54a to the fifth heat medium temperature sensor 54e to switch the flow of the heat medium in the high-temperature side heat medium circuit 21 and the low-temperature side heat medium circuit 30 of the heating unit 20. As a result, the vehicle air conditioner 1 can manage heat in the vehicle using the high-temperature side heat medium and the low-temperature side heat medium.

Further, an operation panel 51 disposed in the vicinity of the instrument panel in the front portion of the interior of the cabin is connected to the input of the control device 50. A plurality of operation switches is disposed on the operation panel 51. Therefore, operation signals from the plurality of operation switches are input to the control device 50. Examples of the various operation switches on the operation panel 51 include an automatic switch, an air conditioner switch, an air volume setting switch, and a temperature setting switch.

The automatic switch is operated when the automatic control operation of the vehicle air conditioner 1 is set or released. The air conditioner switch is operated when the air-conditioning evaporator 15 is requested to chill the blown air. The air conditioner switch is configured to switch the presence or absence of chilling of the blown air by the input operation. Therefore, the operation of the air conditioner switch corresponds to an example of a switching operation.

The air volume setting switch is operated to manually set the air volume of the blower 42. The temperature setting switch is operated when setting a target temperature Tset in the cabin. Therefore, the operation panel 51 corresponds to an example of an operation unit.

In the control device 50, the control unit that controls various devices to be controlled connected to the output ports thereof is integrally configured, and a configuration (hardware and software) that controls the operation of each device to be controlled constitutes a control unit that controls the operation of each device to be controlled. For example, in the control device 50, a condition determination unit 50*a* is configured to determine whether a condensation condition under which condensation of the refrigerant is assumed to occur in the air-conditioning evaporator 15 is satisfied. The condition determination unit 50*a* corresponds to an example of a determination unit.

In the control device 50, a condensation suppression control unit 50*b* is configured to control the condensation suppression operation for suppressing condensation of the refrigerant in the air-conditioning evaporator 15 when the condensation condition is satisfied.

In the control device 50, an operation determination unit 50*c* is configured to determine validity or invalidity of the operation on the operation panel 51 after the condensation suppression operation. Further, in the control device 50, a mode switching control unit 50*d* is configured to control switching of the operation mode of the vehicle air conditioner 1 after the condensation suppression operation.

Next, the operation of the vehicle air conditioner 1 in the first embodiment will be described. As described above, the vehicle air conditioner 1 according to the first embodiment can appropriately switch between the plurality of operation modes. Switching between these operation modes is performed by executing a control program stored in advance in the control device 50.

More specifically, in the control program, a target blown air temperature TAO of the blown air to be blown into the cabin is calculated based on the detection signal detected by the sensor group for air-conditioning control and the operation signal output from the operation panel 51.

Specifically, the target blown air temperature TAO is calculated by the following Formula F1, $$TAO = Kset \times Tset - Kr \times Tr - Kam \times Tam - Ks \times As + C \quad (F1)$$

where Tset is a target temperature (interior of the cabin set temperature) of the interior of the cabin set by the temperature setting switch, Tr is an inside air temperature detected by the inside air temperature sensor 52*a*, Tam is an outside air temperature detected by the outside air temperature sensor 52*b*, and As is a solar radiation amount detected by the solar radiation sensor 52*c*. Kset, Kr, Kam, and Ks are control gains, and C is a correction constant.

In the control program, when the target blown air temperature TAO is lower than a predetermined cooling reference temperature a in a state where the air conditioner switch of the operation panel 51 is turned on, the air-conditioning operation mode is switched to the cooling mode.

In the control program, when the target blown air temperature TAO is equal to or higher than the cooling reference temperature a in a state where the air conditioner switch of the operation panel 51 is turned on, the air-conditioning operation mode is switched to the dehumidifying/heating mode. Further, when the target blown air temperature TAO is equal to or higher than the cooling reference temperature a in a state where the air conditioner switch is not turned on, the air-conditioning operation mode is switched to the heating mode.

In the control program, the presence or absence of chilling of the battery B is switched according to the battery temperature TBA. Specifically, when the battery temperature TBA is equal to or higher than a reference battery temperature KTBA, the operation mode is switched to an operation mode in which the battery chilling request is output to chill the battery B.

Therefore, the operation mode of the vehicle air conditioner 1 is determined by a combination of the air-conditioning operation mode and the operation mode indicating the presence or absence of chilling of the battery B. For example, when the battery temperature TBA is equal to or higher than the reference battery temperature KTBA in a state where the interior of the cabin is not air-conditioned, the operation mode of the vehicle air conditioner 1 is switched to the single chilling mode for chilling the battery B without air-conditioning the interior of the cabin.

Therefore, the operation mode of the vehicle air conditioner 1 includes a cooling mode, a heating mode, a dehumidifying/heating mode, a single chilling mode, a chilling/cooling mode, a chilling/heating mode, and a chilling/dehumidifying/heating mode. Each operation mode will be described below.

(a) Cooling Mode

The cooling mode is an operation mode in which the blown air W is chilled by the air-conditioning evaporator 15 and blown into the cabin without chilling the battery B using the refrigeration cycle 10. In the cooling mode, the control device 50 opens the first expansion valve 14*a* at a predetermined throttle opening degree and fully closes the second expansion valve 14*b*.

Therefore, in the refrigeration cycle 10 in the cooling mode, a circulation circuit of the refrigerant flowing through the compressor 11, the heat medium refrigerant heat exchanger 12, the first expansion valve 14*a*, the air-conditioning evaporator 15, and the compressor 11 in this order is configured.

In this cycle configuration, the control device 50 performs control so that the operations of the various devices to be controlled connected to the output ports are in a mode suitable for the cooling mode according to the detection result by the control sensor group and the like. Specifically, the control device 50 controls the refrigerant discharge capacity of the compressor 11, the throttle opening degree of the first expansion valve 14*a*, the blowing capacity of the blower 42, the opening degree of the air mixing door 44, and the like.

In the high-temperature side heat medium circuit 21 in the cooling mode, the control device 50 causes the high-temperature pump 22 and the high-temperature flow rate adjustment valve 25 to be in a state suitable for the cooling mode. As a result, in the high-temperature side heat medium circuit 21, the high-temperature side heat medium flows and circulates through the high-temperature pump 22, the heat medium refrigerant heat exchanger 12, the electric heater 26, the high-temperature flow rate adjustment valve 25, the radiator 24, and the high-temperature pump 22 in this order.

In the low-temperature side heat medium circuit 30 in the cooling mode, since the low pressure refrigerant does not flow into the chiller 16, the circulation of the low-temperature side heat medium in the low-temperature side heat medium circuit 30 can be stopped.

Therefore, the vehicle air conditioner 1 in the cooling mode can chill the interior of the cabin by blowing the blown air W chilled by the air-conditioning evaporator 15 into the cabin.

(b) Heating Mode

The heating mode is an operation mode in which the blown air W is heated by the heater core 23 and blown into the cabin without chilling the battery B using the refrigeration cycle 10. In the heating mode, the control device 50 fully closes the first expansion valve 14*a* and opens the second expansion valve 14*b* at a predetermined throttle opening degree. Therefore, in the refrigeration cycle 10 in the heating mode, a refrigerant circulation circuit in which the refrigerant circulates through the compressor 11, the heat medium refrigerant heat exchanger 12, the second expansion valve 14b, the chiller 16, and the compressor 11 in this order is configured.

In this cycle configuration, the control device 50 performs control so that the operations of the various devices to be controlled connected to the output ports are in a mode suitable for the heating mode according to the detection result by the control sensor group or the like. Specifically, the control device 50 controls the refrigerant discharge capacity of the compressor 11, the throttle opening degree of the second expansion valve 14b, the blowing capacity of the blower 42, the opening degree of the air mixing door 44, and the like.

In the high-temperature side heat medium circuit 21 in the heating mode, the control device 50 causes the high-temperature pump 22, the high-temperature flow rate adjustment valve 25, and the electric heater 26 to be in a state suitable for the heating mode. As a result, in the high-temperature side heat medium circuit 21, the high-temperature side heat medium flows and circulates through the high-temperature pump 22, the heat medium refrigerant heat exchanger 12, the electric heater 26, the high-temperature flow rate adjustment valve 25, the heater core 23, and the high-temperature pump 22 in this order.

In the low-temperature side heat medium circuit 30 in the heating mode, the control device 50 controls the low-temperature pump 31 and the low-temperature flow rate adjustment valve 34 so that the low-temperature side heat medium circulates through the low-temperature pump 31, the outside air heat exchanger 33, the low-temperature flow rate adjustment valve 34, the chiller 16, and the low-temperature pump 31 in this order.

That is, the vehicle air conditioner 1 in the heating mode can perform heating by pumping up, by the refrigeration cycle 10, heat absorbed from the outside air OA in the outside air heat exchanger 33 of the low-temperature side heat medium circuit 30, and using the heat for heating the blown air W via the high-temperature side heat medium circuit 21.

(c) Dehumidifying/Heating Mode

The dehumidifying/heating mode is an operation mode in which the blown air W chilled by the air-conditioning evaporator 15 is heated by the heater core 23 and blown into the cabin without chilling the battery B using the refrigeration cycle 10. In the dehumidifying/heating mode, the control device 50 opens each of the first expansion valve 14a and the second expansion valve 14b at predetermined throttle opening degrees.

Therefore, in the refrigeration cycle 10 in the dehumidifying/heating mode, the refrigerant circulates through the compressor 11, the heat medium refrigerant heat exchanger 12, the first expansion valve 14a, the air-conditioning evaporator 15, and the compressor 11 in this order. At the same time, the refrigerant circulates through the compressor 11, the heat medium refrigerant heat exchanger 12, the second expansion valve 14b, the chiller 16, and the compressor 11 in this order. That is, in the refrigeration cycle 10 in the dehumidifying/heating mode, a refrigerant circulation circuit in which the air-conditioning evaporator 15 and the chiller 16 are connected in parallel for the flow of the refrigerant flowing out of the heat medium refrigerant heat exchanger 12 is configured.

In this cycle configuration, the control device 50 performs control so that the operations of the various devices to be controlled connected to the output ports are in a mode suitable for the dehumidifying/heating mode according to the detection result by the control sensor group and the like. Specifically, the control device 50 controls the refrigerant discharge capacity of the compressor 11, the throttle opening degrees of the first expansion valve 14a and the second expansion valve 14b, the blowing capacity of the blower 42, the opening degree of the air mixing door 44, and the like.

In the high-temperature side heat medium circuit 21 in the dehumidifying/heating mode, the control device 50 causes the high-temperature pump 22, the high-temperature flow rate adjustment valve 25, and the electric heater 26 to be in a state suitable for the dehumidifying/heating mode. As a result, in the high-temperature side heat medium circuit 21, the high-temperature side heat medium flows and circulates through the high-temperature pump 22, the heat medium refrigerant heat exchanger 12, the electric heater 26, the high-temperature flow rate adjustment valve 25, the heater core 23, and the high-temperature pump 22 in this order.

In the low-temperature side heat medium circuit 30 in the dehumidifying/heating mode, the control device 50 controls the low-temperature pump 31 and the low-temperature flow rate adjustment valve 34 so that the low-temperature side heat medium circulates through the low-temperature pump 31, the outside air heat exchanger 33, the low-temperature flow rate adjustment valve 34, the chiller 16, and the low-temperature pump 31 in this order.

Accordingly, the vehicle air conditioner 1 in the dehumidifying/heating mode can realize dehumidifying and heating in which heat absorbed from the outside air OA in the low-temperature side heat medium circuit 30 is pumped up by the refrigeration cycle 10 and the chilled blown air W is heated through the high-temperature side heat medium circuit 21.

(d) Single Chilling Mode

The single chilling mode is an operation mode in which the battery B is chilled using the refrigeration cycle 10 without performing the air-conditioning operation for the interior of the cabin. In the single chilling mode, the control device 50 fully closes the first expansion valve 14a and opens the second expansion valve 14b at a predetermined throttle opening degree. Therefore, in the refrigeration cycle 10 in the single chilling mode, a refrigerant circulation circuit in which the refrigerant circulates through the compressor 11, the heat medium refrigerant heat exchanger 12, the second expansion valve 14b, the chiller 16, and the compressor 11 in this order is configured.

In this cycle configuration, the control device 50 performs control so that the operations of the various devices to be controlled connected to the output ports are in a mode suitable for the single chilling mode according to the detection result by the control sensor group and the like. Specifically, the control device 50 controls the refrigerant discharge capacity of the compressor 11, the throttle opening degree of the second expansion valve 14b, the opening degree of the air mixing door 44, and the like.

In the high-temperature side heat medium circuit 21 in the single chilling mode, the control device 50 causes the high-temperature pump 22 and the high-temperature flow rate adjustment valve 25 to be in a state suitable for the single chilling mode. As a result, in the high-temperature side heat medium circuit 21, the high-temperature side heat medium flows and circulates through the high-temperature pump 22, the heat medium refrigerant heat exchanger 12, the electric heater 26, the high-temperature flow rate adjustment valve 25, the radiator 24, and the high-temperature pump 22 in this order.

In the low-temperature side heat medium circuit 30 in the single chilling mode, the control device 50 controls the low-temperature pump 31 and the low-temperature flow rate adjustment valve 34. As a result, in the low-temperature side heat medium circuit 30, the low-temperature side heat medium flows and circulates through the low-temperature pump 31, the device heat exchange unit 32, the low-temperature flow rate adjustment valve 34, the chiller 16, and the low-temperature pump 31 in this order.

As a result, the vehicle air conditioner 1 in the single chilling mode can cause the low-temperature side heat medium chilled by the heat exchange with the low pressure refrigerant in the chiller 16 to flow through the heat medium passage 32a of the device heat exchange unit 32, so that the battery B can be chilled using the refrigeration cycle 10.

The vehicle air conditioner 1 can pump heat absorbed by the chiller 16 in the refrigeration cycle 10 and dissipate the heat to the high-temperature side heat medium in the high-temperature side heat medium circuit 21 by the heat medium refrigerant heat exchanger 12. Furthermore, the vehicle air conditioner 1 can dissipate the heat of the high-temperature side heat medium to the outside air OA by the radiator 24.

(e) Chilling/Cooling Mode

The chilling/cooling mode is an operation mode in which the blown air W is chilled by the air-conditioning evaporator 15 and blown into the cabin in parallel with the chilling of the battery B using the refrigeration cycle 10. In the chilling/cooling mode, the control device 50 opens each of the first expansion valve 14a and the second expansion valve 14b at predetermined throttle opening degrees.

Therefore, in the refrigeration cycle 10 in the chilling/cooling mode, the refrigerant circulates through the compressor 11, the heat medium refrigerant heat exchanger 12, the first expansion valve 14a, the air-conditioning evaporator 15, and the compressor 11 in this order. At the same time, the refrigerant circulates through the compressor 11, the heat medium refrigerant heat exchanger 12, the second expansion valve 14b, the chiller 16, and the compressor 11 in this order. That is, in the refrigeration cycle 10 in the chilling/cooling mode, a refrigerant circulation circuit in which the air-conditioning evaporator 15 and the chiller 16 are connected in parallel for the flow of the refrigerant flowing out of the heat medium refrigerant heat exchanger 12 is configured.

In this cycle configuration, the control device 50 performs control so that the operations of the various devices to be controlled connected to the output ports are in a mode suitable for the chilling/cooling mode according to the detection result by the control sensor group and the like. Specifically, the control device 50 controls the refrigerant discharge capacity of the compressor 11, the throttle opening degrees of the first expansion valve 14a and the second expansion valve 14b, the blowing capacity of the blower 42, the opening degree of the air mixing door 44, and the like.

In the high-temperature side heat medium circuit 21 in the chilling/cooling mode, the control device 50 causes the high-temperature pump 22 and the high-temperature flow rate adjustment valve 25 to be in a state suitable for the chilling/cooling mode. As a result, in the high-temperature side heat medium circuit 21, the high-temperature side heat medium flows and circulates through the high-temperature pump 22, the heat medium refrigerant heat exchanger 12, the electric heater 26, the high-temperature flow rate adjustment valve 25, the radiator 24, and the high-temperature pump 22 in this order.

In the low-temperature side heat medium circuit 30 in the chilling/cooling mode, the control device 50 causes the low-temperature pump 31 and the low-temperature flow rate adjustment valve 34 to be in a state suitable for the chilling/cooling mode. As a result, in the low-temperature side heat medium circuit 30, the low-temperature side heat medium flows and circulates through the low-temperature pump 31, the device heat exchange unit 32, the low-temperature flow rate adjustment valve 34, the chiller 16, and the low-temperature pump 31 in this order.

As a result, the vehicle air conditioner 1 in the chilling/cooling mode can cause the heat medium chilled by the heat exchange with the low pressure refrigerant in the chiller 16 to flow through the device heat exchange unit 32, and thus can chill the battery B.

In the chilling/cooling mode, the low pressure refrigerant is evaporated by heat exchange with the blown air W in the air-conditioning evaporator 15 to chill the blown air W, thereby cooling the interior of the cabin. Therefore, the vehicle air conditioner 1 in the chilling/cooling mode can improve comfort by cooling the interior of the cabin together with chilling the battery B using the refrigeration cycle 10.

(f) Chilling/Heating Mode

The chilling/heating mode is an operation mode in which the blown air W is heated by the heater core 23 and blown into the cabin in parallel with the chilling of the battery B using the refrigeration cycle 10. In the chilling/heating mode, the control device 50 fully closes the first expansion valve 14a and opens the second expansion valve 14b at a predetermined throttle opening degree. Therefore, in the refrigeration cycle 10 in the chilling/heating mode, a refrigerant circulation circuit in which the refrigerant circulates through the compressor 11, the heat medium refrigerant heat exchanger 12, the second expansion valve 14b, the chiller 16, and the compressor 11 in this order is configured.

In this cycle configuration, the control device 50 performs control so that the operations of the various devices to be controlled connected to the output ports are in a mode suitable for the chilling/heating mode according to the detection result by the control sensor group or the like. Specifically, the control device 50 controls the refrigerant discharge capacity of the compressor 11, the throttle opening degree of the second expansion valve 14b, the blowing capacity of the blower 42, the opening degree of the air mixing door 44, and the like.

In the high-temperature side heat medium circuit 21 in the chilling/heating mode, the control device 50 causes the high-temperature pump 22, the high-temperature flow rate adjustment valve 25, and the electric heater 26 to be in a state suitable for the chilling/heating mode. As a result, in the high-temperature side heat medium circuit 21, the high-temperature side heat medium flows and circulates through the high-temperature pump 22, the heat medium refrigerant heat exchanger 12, the electric heater 26, the high-temperature flow rate adjustment valve 25, the heater core 23, and the high-temperature pump 22 in this order.

In the low-temperature side heat medium circuit 30 in the chilling/heating mode, the control device 50 causes the low-temperature pump 31 and the low-temperature flow rate adjustment valve 34 to be in a state suitable for the chilling/heating mode. As a result, in the low-temperature side heat medium circuit 30, the low-temperature side heat medium flows and circulates through the low-temperature pump 31, the device heat exchange unit 32, the low-temperature flow rate adjustment valve 34, the chiller 16, and the low-temperature pump 31 in this order.

As a result, the vehicle air conditioner 1 in the chilling/heating mode can cause the heat medium chilled by the heat exchange with the low pressure refrigerant in the chiller 16 to flow through the device heat exchange unit 32, and thus can chill the battery B.

In the chilling/heating mode, the waste heat of the battery B is pumped up by the refrigeration cycle 10 and radiated to the blown air W by the heater core 23, so that the interior of the cabin can be heated. Therefore, the vehicle air conditioner 1 in the chilling/heating mode can improve comfort by heating the interior of the cabin using waste heat of the battery B as a heat source while chilling the battery B using the refrigeration cycle 10.

(g) Chilling/Dehumidifying/Heating Mode

The chilling/dehumidifying/heating mode is an operation mode in which the blown air W chilled by the air-conditioning evaporator 15 is heated by the heater core 23 and blown into the cabin in parallel with the chilling of the battery B using the refrigeration cycle 10. In the chilling/dehumidifying/heating mode, the control device 50 opens the first expansion valve 14a and the second expansion valve 14b at predetermined throttle opening degrees.

Therefore, in the refrigeration cycle 10 in the chilling/dehumidifying/heating mode, the refrigerant circulates through the compressor 11, the heat medium refrigerant heat exchanger 12, the first expansion valve 14a, the air-conditioning evaporator 15, and the compressor 11 in this order. At the same time, the refrigerant circulates through the compressor 11, the heat medium refrigerant heat exchanger 12, the second expansion valve 14b, the chiller 16, and the compressor 11 in this order.

That is, in the refrigeration cycle 10 in the chilling/dehumidifying/heating mode, a refrigerant circulation circuit in which the air-conditioning evaporator 15 and the chiller 16 are connected in parallel for the flow of the refrigerant flowing out of the heat medium refrigerant heat exchanger 12 is configured.

In this cycle configuration, the control device 50 performs control so that the operations of the various devices to be controlled connected to the output ports are in a mode suitable for the chilling/dehumidifying/heating mode according to the detection result by the control sensor group or the like. Specifically, the control device 50 controls the refrigerant discharge capacity of the compressor 11, the throttle opening degrees of the first expansion valve 14a and the second expansion valve 14b, the blowing capacity of the blower 42, the opening degree of the air mixing door 44, and the like.

In the high-temperature side heat medium circuit 21 in the chilling/dehumidifying/heating mode, the control device 50 causes the high-temperature pump 22, the high-temperature flow rate adjustment valve 25, and the electric heater 26 to be in a state suitable for the chilling/dehumidifying/heating mode. As a result, in the high-temperature side heat medium circuit 21, the high-temperature side heat medium flows and circulates through the high-temperature pump 22, the heat medium refrigerant heat exchanger 12, the electric heater 26, the high-temperature flow rate adjustment valve 25, the heater core 23, and the high-temperature pump 22 in this order.

In the low-temperature side heat medium circuit 30 in the chilling/dehumidifying/heating mode, the control device 50 causes the low-temperature pump 31 and the low-temperature flow rate adjustment valve 34 to be in a state suitable for the chilling/dehumidifying/heating mode. As a result, in the low-temperature side heat medium circuit 30, the low-temperature side heat medium flows and circulates through the low-temperature pump 31, the device heat exchange unit 32, the low-temperature flow rate adjustment valve 34, the chiller 16, and the low-temperature pump 31 in this order.

As a result, the vehicle air conditioner 1 in the chilling/dehumidifying/heating mode can cause the heat medium chilled by the heat exchange with the low pressure refrigerant in the chiller 16 to flow through the device heat exchange unit 32, and thus can chill the battery B.

In the chilling/dehumidifying/heating mode, the refrigeration cycle 10 pumps up the waste heat of the battery B and radiates the heat to the blown air W chilled by the air-conditioning evaporator 15, so that the dehumidifying and heating of the interior of the cabin can be realized. Therefore, the vehicle air conditioner 1 in the chilling/dehumidifying/heating mode can improve comfort by dehumidifying/heating the interior of the cabin using waste heat of the battery B as a heat source while chilling the battery B using the refrigeration cycle 10.

As described above, among the operation modes of the vehicle air conditioner 1, in the chilling/heating mode, the chiller 16 and the low-temperature side heat medium circuit 30 chill the battery B in a state where the inflow of the refrigerant into the air-conditioning evaporator 15 is cut off.

In the refrigeration cycle 10 in the chilling/heating mode, the high pressure refrigerant discharged from the compressor 11 radiates heat to the high-temperature side heat medium flowing through the heat medium passage 12b and condenses in the heat medium refrigerant heat exchanger 12. The refrigerant flowing out of the heat medium refrigerant heat exchanger 12 is decompressed and expanded by the second expansion valve 14b and flows into the chiller 16.

The low pressure refrigerant flowing into the chiller 16 absorbs heat from the low-temperature side heat medium flowing through the heat medium passage 16b of the chiller 16 and evaporates to chill the low-temperature side heat medium. The outlet of the heat medium passage 16b of the chiller 16 is connected to and communicates with the outlet of the air-conditioning evaporator 15 and the suction port of the compressor 11 via the merging portion 13b.

In the chilling/heating mode, since the first expansion valve 14a is in the closed state, the inlet of the air-conditioning evaporator 15 is closed. Therefore, as indicated by R in FIG. 4, the gas-phase refrigerant evaporated in the chiller 16 can flow into the air-conditioning evaporator 15 from the outlet via the merging portion 13b.

In the chilling/heating mode, it is necessary to heat the interior of the cabin, and thus the blower 42 is operated. As illustrated in FIG. 2, since the air-conditioning evaporator 15 is disposed upstream of the heater core 23 in the blown air flow direction, the blown air passes through the air-conditioning evaporator 15 before being heated by the heater core 23. Accordingly, the blown air supplied for heating the interior of the cabin exchanges heat with the gas-phase refrigerant flowing into the air-conditioning evaporator 15.

In this case, when the temperature (that is, suction air temperature) of the blown air passing through the air-conditioning evaporator 15 is lower than the temperature of the gas-phase refrigerant in the air-conditioning evaporator 15, the gas-phase refrigerant radiates heat to the blown air and condenses inside the air-conditioning evaporator 15 to become a liquid-phase refrigerant. Since the condensed liquid-phase refrigerant stays in the air-conditioning evaporator 15 and liquefied, the amount of the refrigerant circulating in the refrigeration cycle 10 is insufficient.

In a case where the refrigerant condenses inside the air-conditioning evaporator 15, even when the operation is performed in the chilling/heating mode, the amount of the refrigerant circulating in the refrigeration cycle 10 is insufficient. Therefore, it is assumed that the chilling performance of the battery B using the chiller 16 and the low-temperature side heat medium circuit 30 deteriorates. In addition, since the amount of heat pumped up by the refrigeration cycle 10 is also limited, it is expected that the heating capacity of the refrigeration cycle 10 in the chilling/heating mode is lowered.

Figure 5:
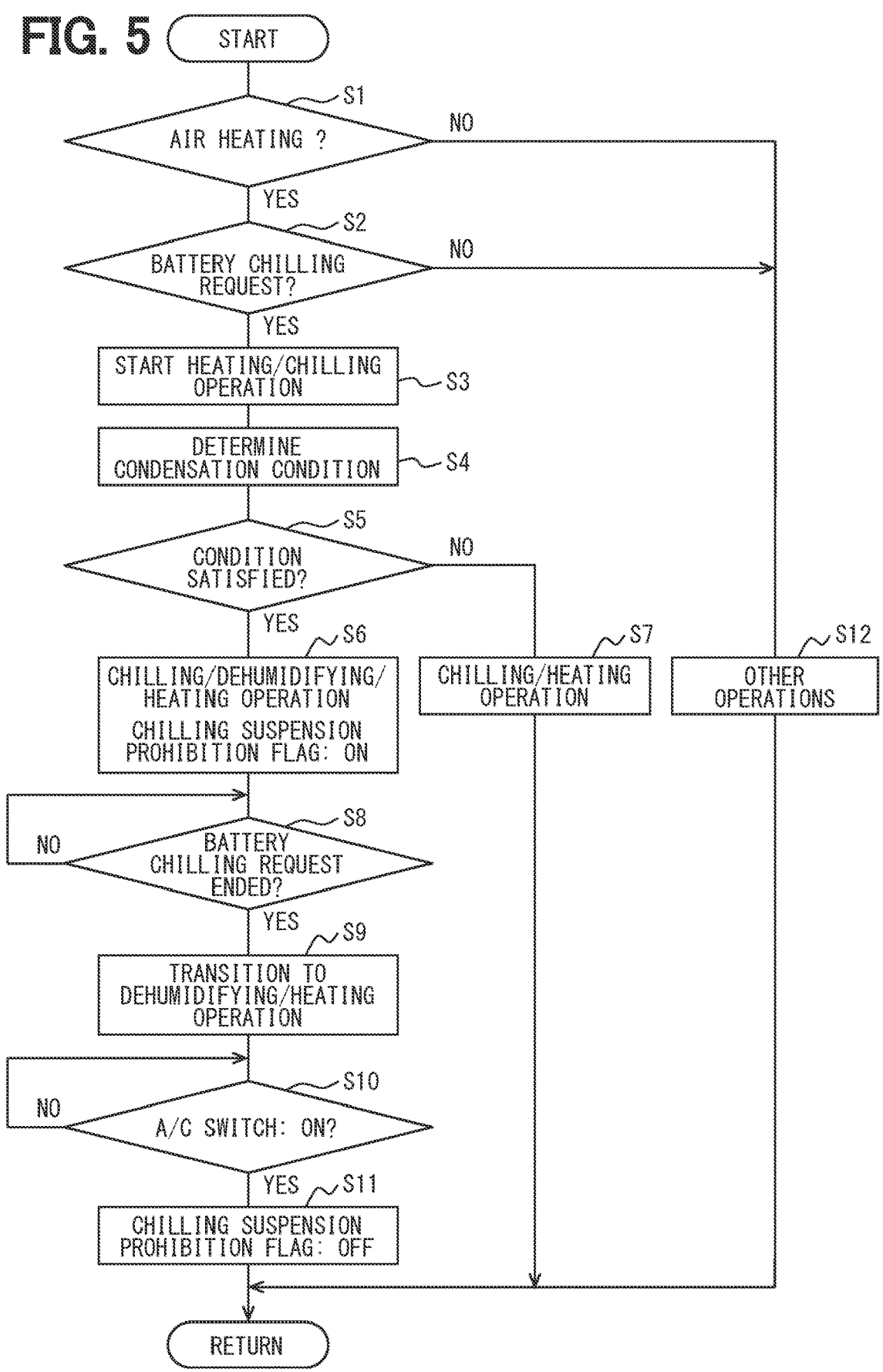
FIG. 5 is a flowchart illustrating a control process of the vehicle air conditioner according to the first embodiment.

Next, control for suppressing condensation of the refrigerant in the air-conditioning evaporator 15 in the chilling/heating mode will be described with reference to FIGS. 5 to 7. The flowchart shown in FIG. 5 illustrates the contents of the control process executed by the control device 50 of the vehicle air conditioner 1. Specifically, the CPU of the control device 50 executes a control program stored in the ROM of the control device 50 to implement this control process.

As illustrated in FIG. 5, first, in step S1, it is determined whether the operation mode of the vehicle air conditioner 1 is an operation mode in which the air-conditioning evaporator 15 chills the blown air and whether it is an operation mode in which the heater core 23 heats the blown air. In other words, it is determined whether the operation mode is the heating mode or the chilling/heating mode.

The determination process in step S1 is performed based on, for example, whether the air conditioner switch on the operation panel 51 is turned on. When it is determined that the operation mode is an operation mode for heating the blown air, the process proceeds to step S2. On the other hand, when it is determined that it is not the case, the process proceeds to step S12, and the operation control regarding another operation mode is performed. In step S12, the operation control regarding the cooling mode, the dehumidifying/heating mode, the single chilling mode, the chilling/cooling mode, or the chilling/dehumidifying/heating mode is performed. After step S12 ends, the control program of FIG. 5 ends.

In step S2, it is determined whether there is a battery chilling request. As described above, the battery chilling request is output when the battery temperature TBA is equal to or higher than the reference battery temperature KTBA. When it is determined that there is a battery chilling request, the process proceeds to step S3 to start the operation control related to the chilling/heating mode. On the other hand, when it is determined that there is no battery chilling request, the process proceeds to step S11, and the operation control related to the heating mode is executed.

After the chilling/heating operation is started in step S3, it is determined in step S4 whether a condensation condition under which the refrigerant is assumed to condense inside the air-conditioning evaporator 15 in the chilling/heating mode is satisfied. In step S4, a control program related to the condensation condition determination process is executed.

Here, the determination process regarding the condensation condition will be described with reference to FIG. 6. When the process proceeds to step S4, first, in step S20, it is determined whether the internal refrigerant saturation temperature inside the air-conditioning evaporator 15 is higher than the suction air temperature detected by the suction air temperature sensor 53c. The internal refrigerant saturation temperature means the refrigerant saturation temperature at a refrigerant pressure inside the air-conditioning evaporator 15, and is identified using a saturation temperature calculated from a pressure detected by the junction pressure sensor 52f.

In other words, the condensation condition in the first embodiment is that the internal refrigerant saturation temperature is higher than the suction air temperature. When it is determined that the internal refrigerant saturation temperature is higher than the suction air temperature, the process proceeds to step S21, and the fact that the condensation condition is satisfied is stored in the RAM. On the other hand, when it is determined that the internal refrigerant saturation temperature is not higher than the suction air temperature, the process proceeds to step S22, and the fact that the condensation condition is not satisfied is stored in the RAM. After the determination result is stored in the RAM, the control program related to the determination of the condensation condition is ended, and the process proceeds to step S5.

The control process in the chilling/heating mode will be described again with reference to FIG. 5. When the process proceeds to step S5, it is determined whether the condensation condition is satisfied with reference to the determination result related to the condensation condition in step S4. In a case where the determination result of step S4 indicates that the condensation condition is satisfied, the process proceeds to step S6. On the other hand, when the determination result of step S4 indicates that the condensation condition is not satisfied, the process proceeds to step S7.

In step S6, the transition is made in accordance with the result of determination that the condensation condition is satisfied. Therefore, when the chilling/heating operation is continued as it is, the refrigerant may be condensed in the air-conditioning evaporator 15, and liquefaction of the refrigerant may occur. Therefore, in step S6, the first expansion valve 14a in the closed state in the normal chilling/heating mode is controlled to allow the inflow of the refrigerant from the inlet of the air-conditioning evaporator 15.

That is, in step S6, in principle, the mode is forcibly changed to the chilling/dehumidifying/heating mode only when the condensation condition is satisfied while the operation is performed in the chilling/heating mode. As a result, a flow of the refrigerant from the side to the outlet is formed inside the air-conditioning evaporator 15, so that it is possible to suppress the inflow of the gas-phase refrigerant from the outlet of the air-conditioning evaporator 15 and to suppress condensation and liquefaction of the refrigerant in the air-conditioning evaporator 15.

The liquid-phase refrigerant condensed in the air-conditioning evaporator 15 can also flow out of the air-conditioning evaporator 15 using the flow of the refrigerant from the inlet to the outlet. As a result, the amount of the refrigerant circulating in the refrigeration cycle 10 can be maintained, so that a decrease in chilling capacity of the battery B and the like can be suppressed.

By forcibly changing to the chilling/dehumidifying/heating mode, the internal refrigerant saturation temperature of the air-conditioning evaporator 15 can be lower than the suction air temperature. Accordingly, from the viewpoint of the relationship between the internal refrigerant saturation temperature and the suction air temperature, it is possible to suppress condensation of the refrigerant and liquefaction of the refrigerant in the air-conditioning evaporator 15.

In step S6, a chilling stop prohibition flag for managing the validity or invalidity of the operation of the air conditioner switch on the operation panel 51 is set to ON. The chilling stop prohibition flag is a flag for prohibiting the interruption (that is, the chilling of the blown air by the air-conditioning evaporator 15 is stopped) of the inflow of the refrigerant into the air-conditioning evaporator 15 by the operation of the air conditioner switch.

Figure 7:
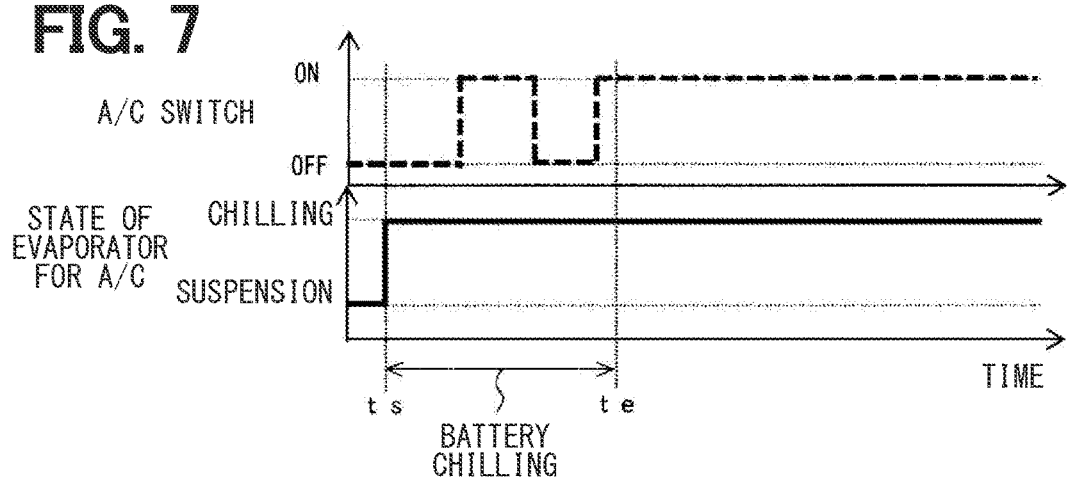
FIG. 7 is an explanatory diagram illustrating an example of a relationship between an operation of an air conditioner switch and chilling of a blown air by the air-conditioning evaporator in the first embodiment.

Therefore, in step S6, even when the OFF operation of the air conditioner switch on the operation panel 51 is performed after the mode is forcibly switched to the chilling/dehumidifying/heating mode, the input of the OFF operation of the air conditioner switch is invalidated and the operation in the chilling/dehumidifying/heating mode is continued as illustrated in FIG. 7.

On the other hand, in step S7, since it is determined that the condensation condition is not satisfied, even when the chilling/heating operation is continued as it is, the refrigerant does not condense inside the air-conditioning evaporator 15, and deterioration of the chilling performance of the battery B due to liquefaction of the refrigerant does not occur. Therefore, in step S7, the operation in the chilling/heating mode is continued while the first expansion valve 14a is closed. After step S7 ends, the control program of FIG. 5 ends.

In step S8, it is determined whether the battery chilling request has ended. As described above, the battery chilling request is output when the battery temperature TBA is equal to or higher than the reference battery temperature KTBA. Therefore, the case where the battery chilling request ends can be said to be a case where the battery temperature TBA is lower than the reference battery temperature KTBA. When the battery chilling request has been completed, the process proceeds to step S9, and when not, the process returns to step S6 to continue the operation in the chilling/dehumidifying/heating mode.

When the process proceeds to step S9, the operation mode of the vehicle air conditioner 1 is changed from the chilling/dehumidifying/heating mode to the dehumidifying/heating mode in accordance with the end of the battery chilling request. That is, in step 9, by the operation of the low-temperature flow rate adjustment valve 34, the low-temperature side heat medium circuit 30 is switched from the circulation path of the low-temperature side heat medium via the device heat exchange unit 32 to the path of the low-temperature side heat medium via the outside air heat exchanger 33.

Even when the circulation path in the low-temperature side heat medium circuit 30 is changed, in the refrigeration cycle 10, a circulation path via the first expansion valve 14a and the air-conditioning evaporator 15 and a circulation path via the second expansion valve 14b and the chiller 16 are formed in parallel. That is, the flowing of the refrigerant into the air-conditioning evaporator 15 is continued by the operation control of the first expansion valve 14a. Thereafter, the process proceeds to step S10.

In step S10, it is determined whether the ON operation of the air conditioner switch on the operation panel 51 has been performed. That is, it is determined whether the ON operation of the air conditioner switch is performed in a state where the battery chilling request is ended. The ON operation of the air conditioner switch in the state where the battery chilling request is ended corresponds to an example of a special operation.

In a case where the ON operation of the air conditioner switch is performed, the process proceeds to step S11. On the other hand, in a case where the ON operation of the air conditioner switch is not performed, the process is on standby until the ON operation of the air conditioner switch is performed. Therefore, when the OFF operation of the air conditioner switch is performed after the end of the battery chilling request, the OFF operation is invalidated and the process is on standby, so that the refrigerant is allowed to flow into the air-conditioning evaporator 15.

In step S11, the chilling stop prohibition flag is set to OFF when the ON operation of the air conditioner switch is performed after the end of the battery chilling request. As a result, the OFF operation of the air conditioner switch after step S11 is validated, and the inflow of the refrigerant into the air-conditioning evaporator 15 from the inlet can be cut off.

When the air-conditioning mode of the interior of the cabin is changed from the dehumidifying/heating mode to the heating mode without the user's intention when the operation mode is changed in accordance with the end of the battery chilling request described above, dehumidification of the blown air by the air-conditioning evaporator 15 is not performed, so that the humidity in the cabin increases. It is assumed that the increase in the humidity in the cabin associated with the change in the air-conditioning mode impairs the comfort of the user. In step S9, since the chilling/dehumidifying/heating mode is changed to the dehumidifying/heating mode, the humidity in the cabin does not increase, and the comfort of the user can be secured.

In step S11, the mode is the dehumidifying/heating mode triggered by the ON operation of the air conditioner switch in step S10. Therefore, the comfort of the interior of the cabin is maintained while the intention of the user is reflected.

Since the OFF operation of the air conditioner switch in and after step S11 is valid, the user can change the dehumidifying/heating mode to the heating mode by performing the OFF operation of the air conditioner switch. In this case, since the user's intention is reflected by the OFF operation of the air conditioner switch, there is no problem even if the humidity in the cabin increases.

In the forced chilling/dehumidifying/heating mode as the condensation suppression operation, the blown air is dehumidified although the intention of the user is not reflected. It is expected that the power of the compressor 11 in the chilling/dehumidifying/heating mode is increased by the dehumidification amount of the blown air as compared with that in the chilling/heating mode, and the energy saving performance of the vehicle air conditioner 1 is reduced.

However, in the vehicle air conditioner 1, at the time of dehumidifying and heating in this case, since the absorption amount of heat absorbed from the blown air is added in the air-conditioning evaporator 15, the power increase in the compressor 11 is small, and the energy saving performance of the vehicle air conditioner 1 is not greatly reduced.

Figure 4:
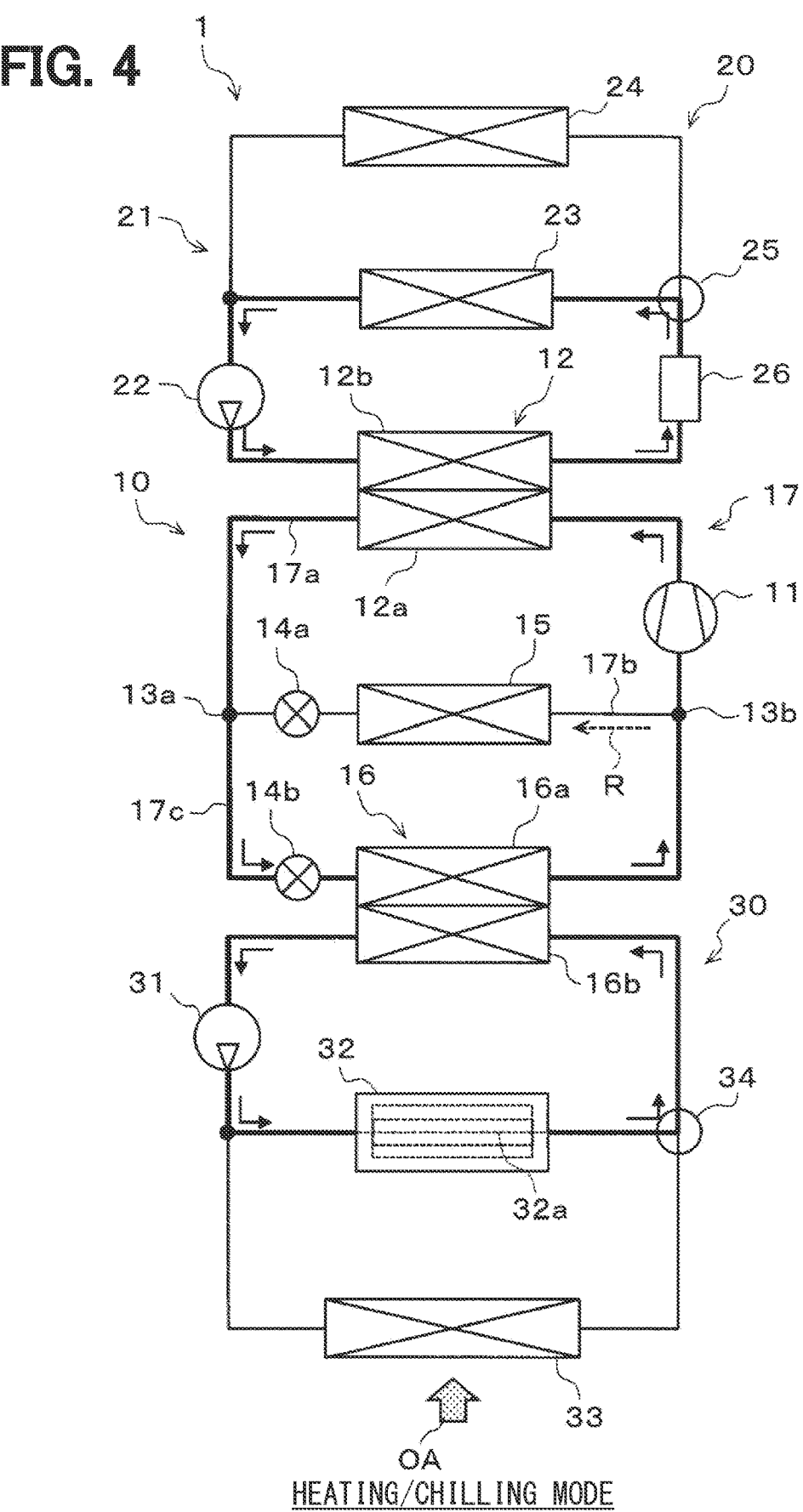
FIG. 4 is an explanatory view illustrating the operation of the vehicle air conditioner in a chilling/heating mode according to the first embodiment.

As described above, the vehicle air conditioner 1 according to the first embodiment controls the operations of the refrigeration cycle 10, the heating unit 20, the low-temperature side heat medium circuit 30, and the like, thereby achieving various operation modes regarding air-conditioning of the interior of the cabin and chilling of the battery B. As shown in FIG. 4, in the chilling/heating mode of the vehicle air conditioner 1, the refrigerant does not flow through the air-conditioning evaporator 15, but the refrigerant flows through the chiller 16 to chill the battery B, and the blown air is heated by the heating unit.

In the chilling/heating mode, the gas-phase refrigerant evaporated by the chiller 16 can flow in from the flow outlet port of the air-conditioning evaporator 15. Therefore, it is expected that, depending on the situation surrounding the air-conditioning evaporator 15, condensation of the refrigerant and liquefaction of the refrigerant occur in the air-conditioning evaporator 15.

The vehicle air conditioner 1 according to the first embodiment determines whether the condensation condition is satisfied in steps S3 and S4, and forcibly changes the chilling/heating mode to the chilling/dehumidifying/heating mode in step S6 when the condensation condition is satisfied.

As a result, a flow of the refrigerant from the inlet to the outlet of the air-conditioning evaporator 15 is generated, so that condensation and liquefaction of the refrigerant in the air-conditioning evaporator 15 can be suppressed. The refrigerant saturation temperature in the air-conditioning evaporator 15 can be made lower than the suction air temperature in the air-conditioning evaporator 15 by forcibly changing the mode to the chilling/dehumidifying/heating mode, so that condensation of the refrigerant in the air-conditioning evaporator 15 can be suppressed. The amount of the refrigerant circulating in the refrigeration cycle 10 can be maintained by suppressing liquefaction of the refrigerant in the air-conditioning evaporator 15, so that the chilling performance of the chiller 16 can be maintained.

In step S1, the vehicle air conditioner 1 determines whether to chill the blown air and whether to heat the blown air according to the operation content of the air conditioner switch, that is, makes a determination on the condensation condition when the blown air is heated. Accordingly, in the operation mode in which the refrigerant is assumed to be condensed in the air-conditioning evaporator 15, the determination process related to the condensation condition can be performed, so that the processing load caused by the determination process of the condensation condition can be minimized.

The vehicle air conditioner 1 is configured to allow the operation of the first expansion valve 14a according to the operation of the air conditioner switch on condition that the ON operation of the air conditioner switch is performed in step S10.

When the inflow of the refrigerant into the air-conditioning evaporator 15 from the inlet is blocked at the time point when the chilling/dehumidifying/heating mode is ended, the dehumidification of the blown air by the air-conditioning evaporator 15 is stopped, so that comfort of the user may be impaired the due to the increase in humidity. In this regard, in the vehicle air conditioner 1, the inflow of the refrigerant into the air-conditioning evaporator 15 from the inlet is continued even when the forced chilling/dehumidifying/heating mode as the condensation suppression operation is ended. As a result, even when the forced chilling/dehumidifying/heating mode is ended, an unintended humidity change does not occur with respect to the blown air, so that the comfort of the user can be secured.

After the ON operation of the air conditioner switch is performed in step S10, the user can operate the air conditioner switch to block the inflow of the refrigerant into the air-conditioning evaporator 15 from the inlet. Therefore, it is also possible to reflect the intention of the user in the air-conditioning mode after the end of the condensation suppression operation.

When the operation mode is changed from the chilling/dehumidifying/heating mode with the completion of the battery chilling request, the circulation path of the low-temperature side heat medium is switched by the low-temperature flow rate adjustment valve 34 from the circulation path via the device heat exchange unit 32 to the circulation path passing through the outside air heat exchanger 33. At this time, the first expansion valve 14a of the refrigeration cycle 10 is controlled to allow the refrigerant to flow into the air-conditioning evaporator 15.

That is, with the completion of the battery chilling request, the chilling/dehumidifying/heating mode is switched to the dehumidifying/heating mode on the premise of outside air heat absorption. By using outside air as a heat source of the blown air and continuing dehumidification of the blown air by the air-conditioning evaporator 15, it is possible to maintain energy saving in the vehicle air conditioner 1 and secure comfort of the user.

Figure 6:
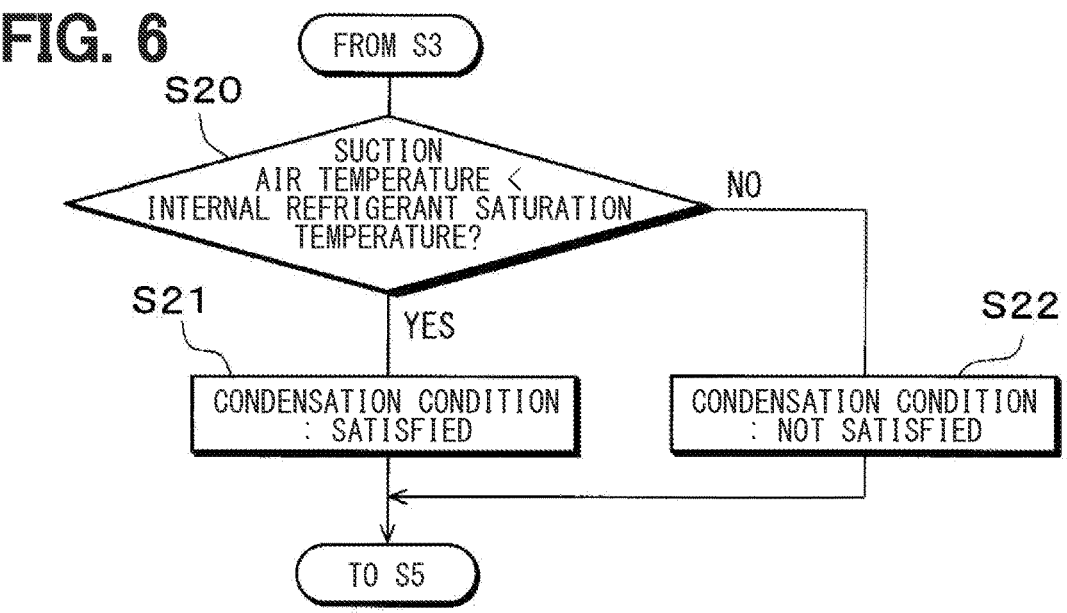
FIG. 6 is a flowchart showing a determination process of a condensation condition in the first embodiment.

As shown in FIG. 6, the determination process of the condensation condition includes comparing the suction air temperature at the air-conditioning evaporator 15 with the internal refrigerant saturation temperature inside the air-conditioning evaporator 15 and determining that the condensation condition is satisfied when the internal refrigerant saturation temperature is higher than the suction air temperature.

Accordingly, in the chilling/heating mode, it is possible to predict and determine with high accuracy whether the refrigerant condenses in the air-conditioning evaporator 15. As a result, the vehicle air conditioner 1 can maintain the chilling performance of the battery B by preventing a decrease in the amount of the refrigerant caused by condensation and liquefaction of the refrigerant.

As illustrated in FIG. 1, the heating unit 20 of the vehicle air conditioner 1 includes the heat medium refrigerant heat exchanger 12 of the refrigeration cycle 10, and the heat medium refrigerant heat exchanger 12 functions as a so-called condenser. The heating unit 20 heats the blown air using the heat of the high pressure refrigerant in the refrigeration cycle 10 as a heat source.

Therefore, the vehicle air conditioner 1 can use the waste heat of the battery B absorbed by the air-conditioning evaporator 15 and the chiller 16 and the heat of the outside air as the heating source of the blown air in the chilling/dehumidifying/heating mode as the condensation suppression operation and the dehumidifying/heating mode after the end of the chilling request.

Second Embodiment

Figure 8:
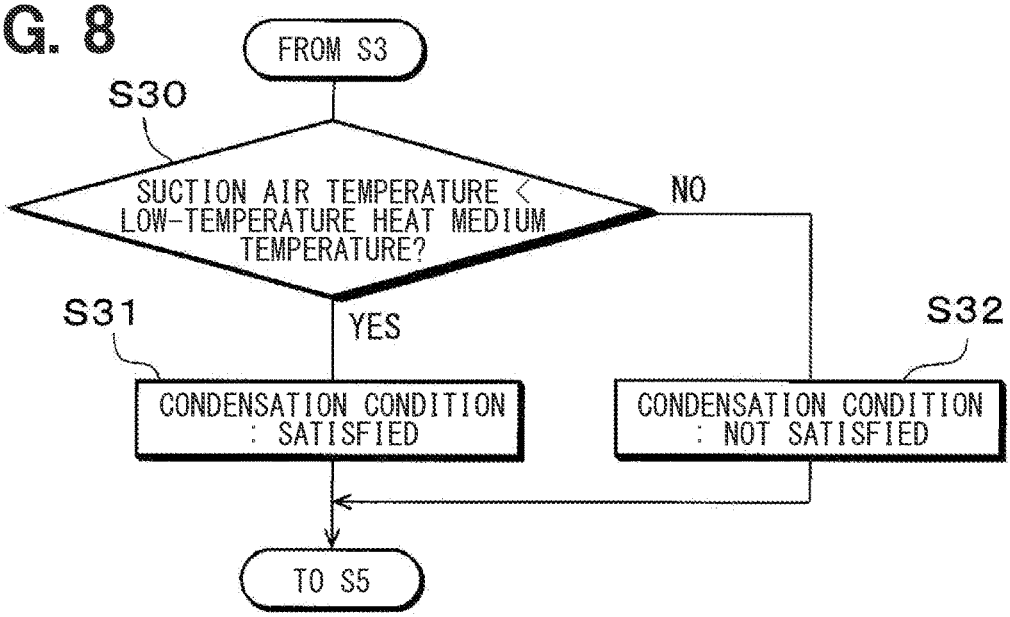
FIG. 8 is a flowchart showing a determination process of a condensation condition in the second embodiment.

Next, the second embodiment different from the first embodiment will be described with reference to FIG. 8. The second embodiment is different from the first embodiment in the content of the determination process regarding the condensation condition in step S4. Since the basic configuration and the like of the vehicle air conditioner 1 are similar to those of the first embodiment, the description thereof will be omitted.

The determination process related to the condensation condition in the second embodiment will be described with reference to FIG. 8. When the process proceeds to step S4, first, in step S30, it is determined whether the low-temperature side heat medium temperature detected by the fourth heat medium temperature sensor 54d is higher than the suction air temperature detected by the suction air temperature sensor 53c.

Here, the fourth heat medium temperature sensor 54d is disposed at the outlet portion of the heat medium passage 16b of the chiller 16, and detects the temperature of the low-temperature side heat medium flowing out of the chiller 16. Therefore, the low-temperature side heat medium temperature detected by the fourth heat medium temperature sensor 54d has a strong correlation with the saturation temperature of the merging portion detected by the junction pressure sensor 52f. The internal refrigerant saturation temperature is identified using a saturation temperature calculated based on the merging portion pressure detected by the junction pressure sensor 52fr. Therefore, the determination of the condensation condition using the low-temperature side heat medium temperature detected by the fourth heat medium temperature sensor 54d and the suction air temperature has the same determination accuracy as that by the first embodiment.

When it is determined that the low-temperature side heat medium temperature detected by the fourth heat medium temperature sensor 54d is higher than the suction air temperature, the process proceeds to step S31, and the fact that the condensation condition is satisfied is stored in the RAM. On the other hand, when it is determined that the low-temperature side heat medium temperature detected by the fourth heat medium temperature sensor 54d is not higher than the suction air temperature, the process proceeds to step S32, and the fact that the condensation condition is not satisfied is stored in the RAM.

After the determination result is stored in the RAM, the control program related to the determination of the condensation condition according to the second embodiment is ended, and the process proceeds to step S5. Since the control process in and after step S5 is similar to that of the first embodiment, the description thereof will be omitted.

As described above, according to the vehicle air conditioner 1 of the second embodiment, even when the condensation condition using the low-temperature side heat medium temperature and the suction air temperature is used, it is possible to similarly obtain the operational effects exhibited from the configuration and operation common to the above-described embodiment.

Third Embodiment

Figure 9:
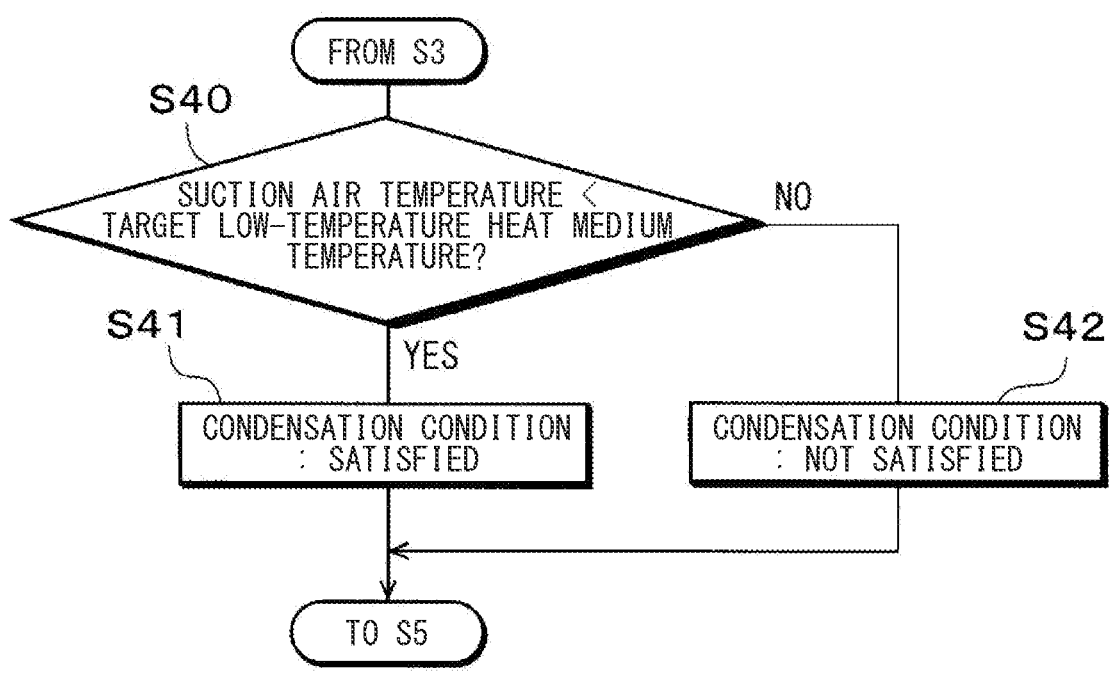
FIG. 9 is a flowchart showing a determination process of a condensation condition in the third embodiment.

Next, the third embodiment different from the above-described first embodiment will be described with reference to FIG. 9. The third embodiment is different from the above-described embodiments in the content of the determination process regarding the condensation condition in step S4. The basic configuration and the like of the vehicle air conditioner 1 are the same as those of the above-described embodiment, and thus the description thereof will be omitted.

The determination process related to the condensation condition in the third embodiment will be described with reference to FIG. 9. When the process proceeds to step S4, first, it is determined whether the target low-temperature side heat medium temperature related to the low-temperature side heat medium circulating in the low-temperature side heat medium circuit 30 is higher than the suction air temperature detected by the suction air temperature sensor 53c.

Here, the target low-temperature side heat medium temperature indicates a target value of the low-temperature side heat medium temperature detected by the fourth heat medium temperature sensor 54d, and the low-temperature side heat medium circuit 30 is set to appropriately chill the battery B chilled via the device heat exchange unit 32. The target low-temperature side heat medium temperature corresponds to an example of a target heat medium temperature. In the third embodiment, the operations of the refrigeration cycle 10 and the low-temperature side heat medium circuit 30 are controlled so that the low-temperature side heat medium temperature detected by the fourth heat medium temperature sensor 54d approaches the target low-temperature side heat medium temperature.

Therefore, when the suction air temperature is lower than the target low-temperature side heat medium temperature, the operation converges to a condition under which the refrigerant condenses and liquefaction of the refrigerant occurs in the air-conditioning evaporator 15. By determining the condensation condition using the target low-temperature side heat medium temperature and the suction air temperature, determination accuracy similar to that of the above-described embodiment can be realized.

When it is determined that the target low-temperature side heat medium temperature is higher than the suction air temperature, the process proceeds to step S41, and the fact that the condensation condition is satisfied is stored in the RAM. On the other hand, when it is determined that the target low-temperature side heat medium temperature is not higher than the suction air temperature, the process proceeds to step S42, and the fact that the condensation condition is not satisfied is stored in the RAM.

After the determination result is stored in the RAM, the control program related to the determination of the condensation condition according to the third embodiment is ended, and the process proceeds to step S5. Since the control process in and after step S5 is similar to that of the above-described embodiments, the description thereof will be omitted.

As described above, according to the vehicle air conditioner 1 of the third embodiment, even when the condensation condition using the target low-temperature side heat medium temperature and the suction air temperature is used, it is possible to similarly obtain the operational effects obtained from the configuration and operation common to the above-described embodiment.

Fourth Embodiment

Next, the third embodiment different from the above-described first embodiment will be described with reference to FIG. 10. In the fourth embodiment, condensation of the refrigerant in the air-conditioning evaporator 15 in the chilling/heating mode is suppressed by the condensation suppression operation different from that in the above-described embodiment. The basic configuration and the like of the vehicle air conditioner 1 according to the fourth embodiment are the same as those of the above-described embodiment, and thus the description thereof will be omitted.

Next, control for suppressing condensation of the refrigerant in the air-conditioning evaporator 15 in the chilling/heating mode in the vehicle air conditioner 1 according to the fourth embodiment will be described with reference to FIG. 10.

In the fourth embodiment, in step S51, it is determined whether the operation mode of the vehicle air conditioner 1 is a mode in which the air-conditioning evaporator 15 chills the blown air and whether it is an operation mode in which the heater core 23 heats the blown air. This determination content is similar to step S1 of the first embodiment.

When it is determined that the operation mode is an operation mode for heating the blown air, the process proceeds to step S52. On the other hand, when it is determined that it is not the case, the process proceeds to step S59, and the operation control regarding the other operation modes is performed. The control content of step S59 is similar to that of step S12.

In step S52, it is determined whether there is a battery chilling request. Step S52 is a determination process similar to step S2 of the first embodiment. When it is determined that there is a battery chilling request, the process proceeds to step S53, and the operation control according to the chilling/heating mode is started. On the other hand, when it is determined that there is no battery chilling request, the process proceeds to step S59, and the operation control related to the heating mode is executed.

After the chilling/heating operation is started in step S53, it is determined in step S54 whether the condensation condition is satisfied in the chilling/heating mode. In step S54, various modes can be used if it can be determined whether the condensation condition is satisfied. That is, any determination process among the determination processes of the first to third embodiments may be used as the determination process of the condensation condition.

When the process proceeds to step S55, it is determined whether the condensation condition is satisfied with reference to the determination result related to the condensation condition in step S54. In a case where the determination result of step S54 indicates that the condensation condition is satisfied, the process proceeds to step S56. On the other hand, when the determination result of step S54 indicates that the condensation condition is not satisfied, the process proceeds to step S57.

In step S56, the throttle opening degree of the second expansion valve 14b is controlled in the operation state of the chilling/heating mode. Specifically, the throttle opening degree of the second expansion valve 14b is set to be smaller than that in the normal state so that the internal refrigerant saturation temperature of the air-conditioning evaporator 15 is lower than the suction air temperature at the air-conditioning evaporator 15. Accordingly, by controlling the opening degree of the second expansion valve 14b, it is possible to suppress condensation and liquefaction of the refrigerant in the air-conditioning evaporator 15 in the chilling/heating mode.

On the other hand, in step S57 to which the process proceeds when the condensation condition is not satisfied, the operation control in the normal chilling/heating mode is performed. The throttle opening degree of the second expansion valve 14b in this case is set so that the power of the compressor 11 decreases, for example, when the temperature of the low-temperature side heat medium chilled by the chiller 16 is lowered to a temperature at which the battery B can be chilled by the device heat exchange unit 32.

Thereafter, in step S58, it is determined whether to end the chilling/heating operation. The case where the chilling/heating operation is ended includes a case where the battery chilling request is ended as in the above-described embodiment, a case where the end of the chilling/heating operation is input by a user operation on the operation panel 51, and the like.

Figure 10:
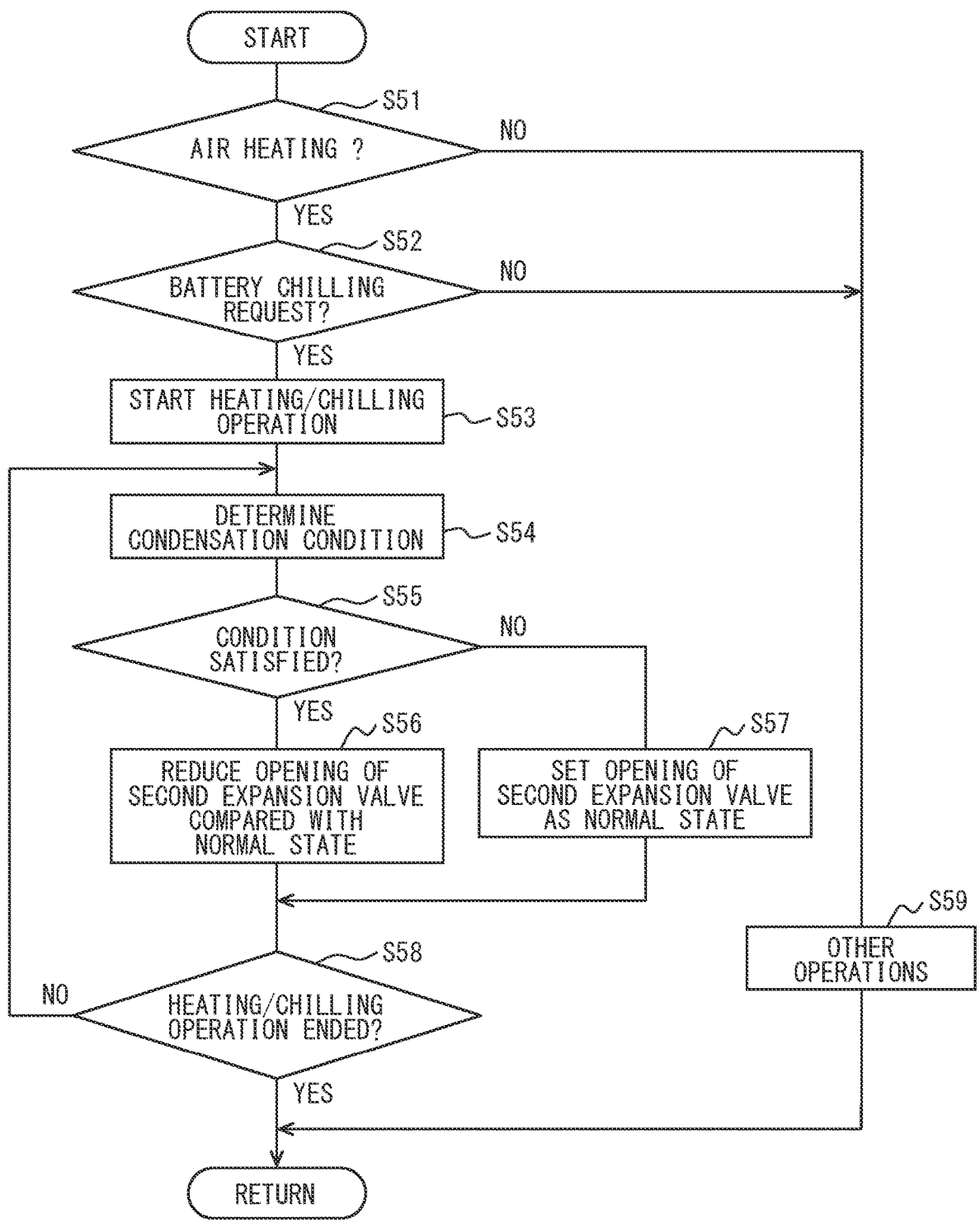
FIG. 10 is a flowchart illustrating a control process of the vehicle air conditioner according to the fourth embodiment.

When it is determined that the chilling/heating operation is ended, the control program of FIG. 10 is ended. On the other hand, when it is determined that the chilling/heating operation is not ended, the process returns to step S54 to continue the chilling/heating operation.

As described above, the vehicle air conditioner 1 according to the fourth embodiment controls the operations of the refrigeration cycle 10, the heating unit 20, the low-temperature side heat medium circuit 30, and the like, thereby realizing various operation modes regarding air-conditioning of the interior of the cabin and chilling of the battery B.

In the chilling/heating mode of the vehicle air conditioner 1, the refrigerant does not flow through the air-conditioning evaporator 15, but the refrigerant flows through the chiller 16 to chill the battery B, and the blown air is heated by the heating unit. In the chilling/heating mode, the gas-phase refrigerant evaporated by the chiller 16 can flow in from the flow outlet port of the air-conditioning evaporator 15. Therefore, it is expected that, depending on the situation surrounding the air-conditioning evaporator 15, condensation of the refrigerant and liquefaction of the refrigerant occur in the air-conditioning evaporator 15.

The vehicle air conditioner 1 according to the fourth embodiment determines whether the condensation condition is satisfied in steps S54 and S55. When the condensation condition is satisfied, the vehicle air conditioner 1 decreases the opening degree of the second expansion valve 14b to adjust the amount of pressure reduction so that the refrigerant saturation temperature inside the air-conditioning evaporator 15 is lower than the suction air temperature at the air-conditioning evaporator 15 as the condensation suppression operation.

As a result, the refrigerant saturation temperature inside the air-conditioning evaporator 15 is lower than the suction air temperature, so that condensation and liquefaction of the refrigerant in the air-conditioning evaporator 15 can be suppressed. Furthermore, the amount of the refrigerant circulating in the refrigeration cycle 10 can be secured by suppressing liquefaction of the refrigerant in the air-conditioning evaporator 15, so that the chilling performance of the chiller 16 can be maintained.

The present disclosure is not limited to the above-described embodiments, and can be variously modified as follows without departing from the gist of the present disclosure.

The configuration of the refrigeration cycle 10 in the vehicle air conditioner 1 is not limited to the above-described embodiments. Various configurations can be used as long as the refrigeration cycle 10 includes, on the low-pressure side, the air-conditioning evaporator, the chilling evaporator, the air-conditioning flow rate adjustment unit, the air-conditioning side flow path, and the detour flow path.

Figure 11:
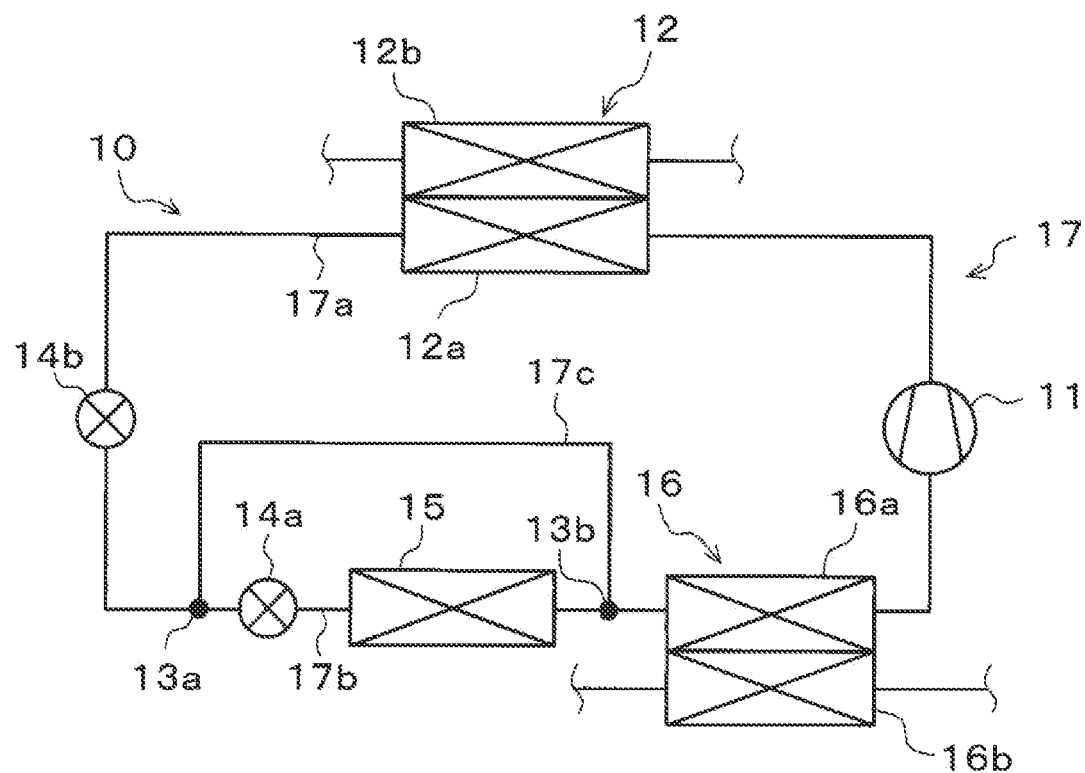
FIG. 11 is a first modification of the low-pressure-side configuration of a refrigeration cycle in the vehicle air conditioner.
Figure 12:
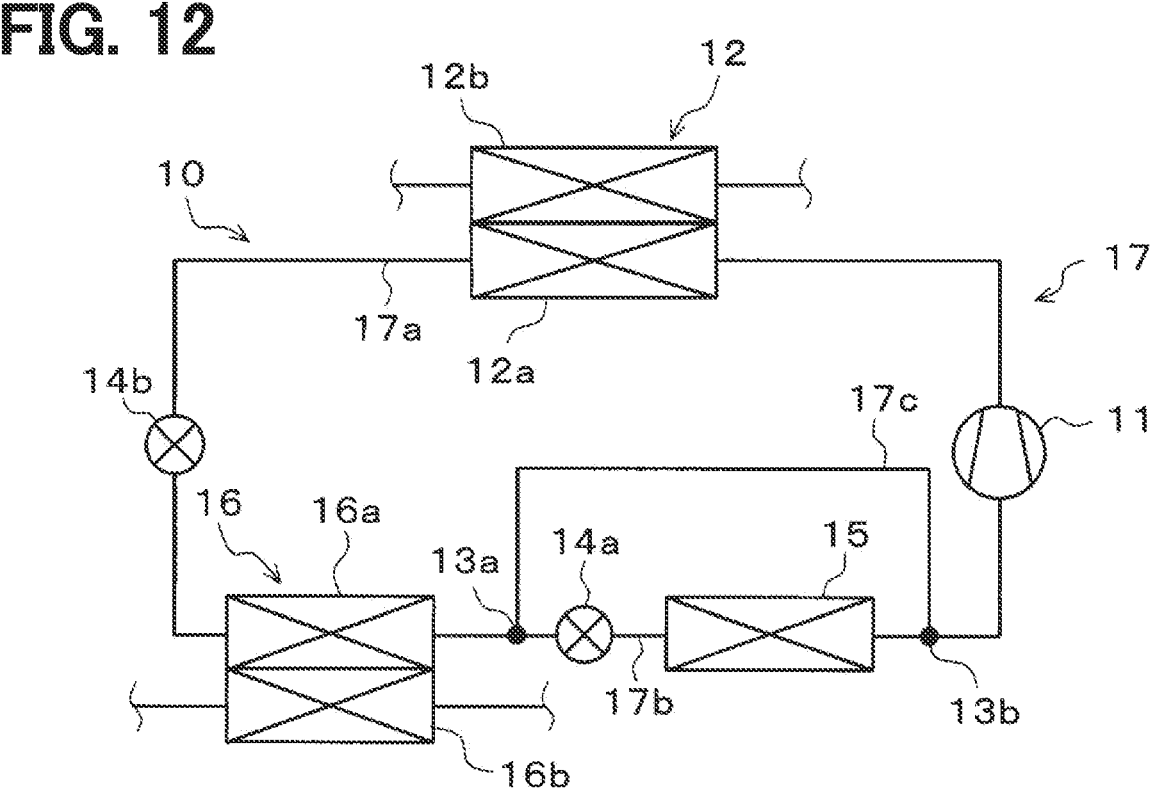
FIG. 12 is a second modification of the low-pressure-side configuration of a refrigeration cycle in the vehicle air conditioner.

For example, as illustrated in FIGS. 11 and 12, the air-conditioning evaporator 15 and the chiller 16 may be disposed in series in the refrigeration cycle 10 on the low-pressure side. As illustrated in FIG. 11, the first expansion valve 14a and the air-conditioning evaporator 15 may be disposed in the through flow path 17b disposed upstream of the chiller 16, and the detour flow path 17c may be disposed so as to detour around the first expansion valve 14a and the air-conditioning evaporator 15.

As illustrated in FIG. 12, the first expansion valve 14a and the air-conditioning evaporator 15 may be disposed in the through flow path 17b disposed downstream of the chiller 16, and the detour flow path 17c may be disposed so as to detour around the first expansion valve 14a and the air-conditioning evaporator 15.

In the above-described embodiment, the heating unit 20 is configured by the heat medium refrigerant heat exchanger 12 and the high-temperature side heat medium circuit 21, but the present invention is not limited to this configuration. Various modes can be used as long as the blown air can be heated using the heat of the high pressure refrigerant in the refrigeration cycle 10 as a heat source.

Figure 13:
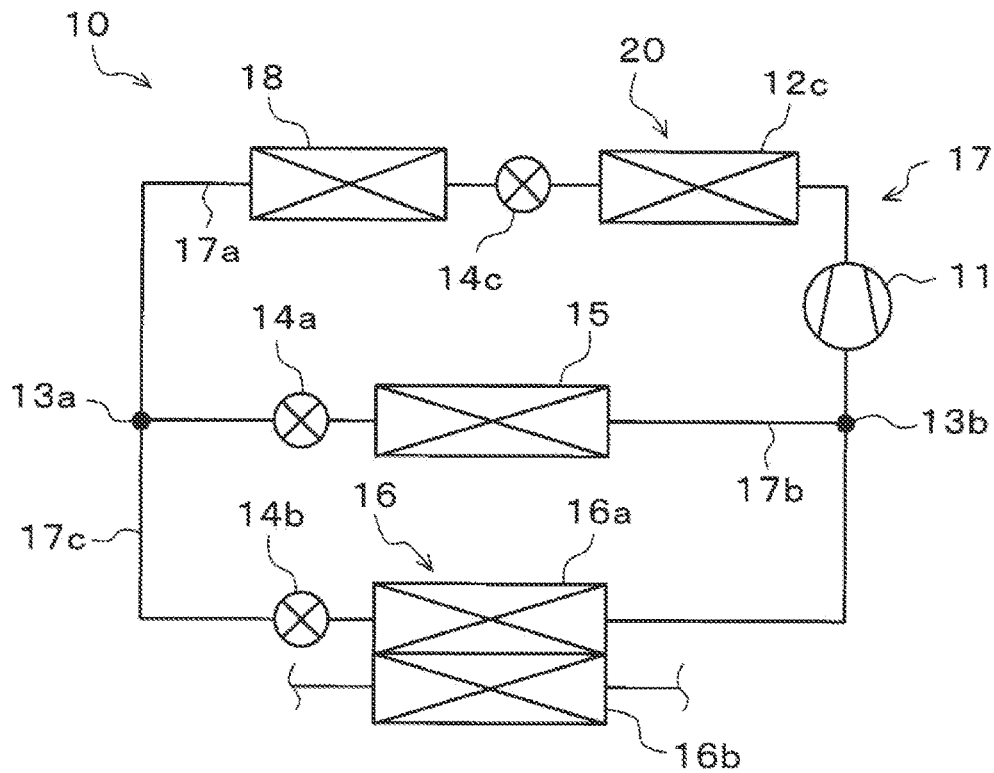
FIG. 13 is a modification of a heating unit in the vehicle air conditioner.

For example, as illustrated in FIG. 13, an interior condenser 12c and an exterior heat exchanger 18 may constitute the heating unit 20. In this case, the interior condenser 12c is disposed at the position of the heater core 23 in the above-described embodiment. The exterior heat exchanger 18 is configured to radiate residual heat in the refrigerant flowing out of the interior condenser 12c to the outside air. A third expansion valve 14c having a full-open function is disposed between the flow outlet port of the heat medium refrigerant heat exchanger 12 and the flow inlet port of the exterior heat exchanger 18.

In the above-described embodiment, as the condensation suppression operation, the chilling/heating mode is forcibly changed to the chilling/dehumidifying/heating mode, or the opening degree of the second expansion valve 14b in the chilling/heating mode is reduced. However, the content of the condensation suppression operation is not limited thereto.

Figure 14:
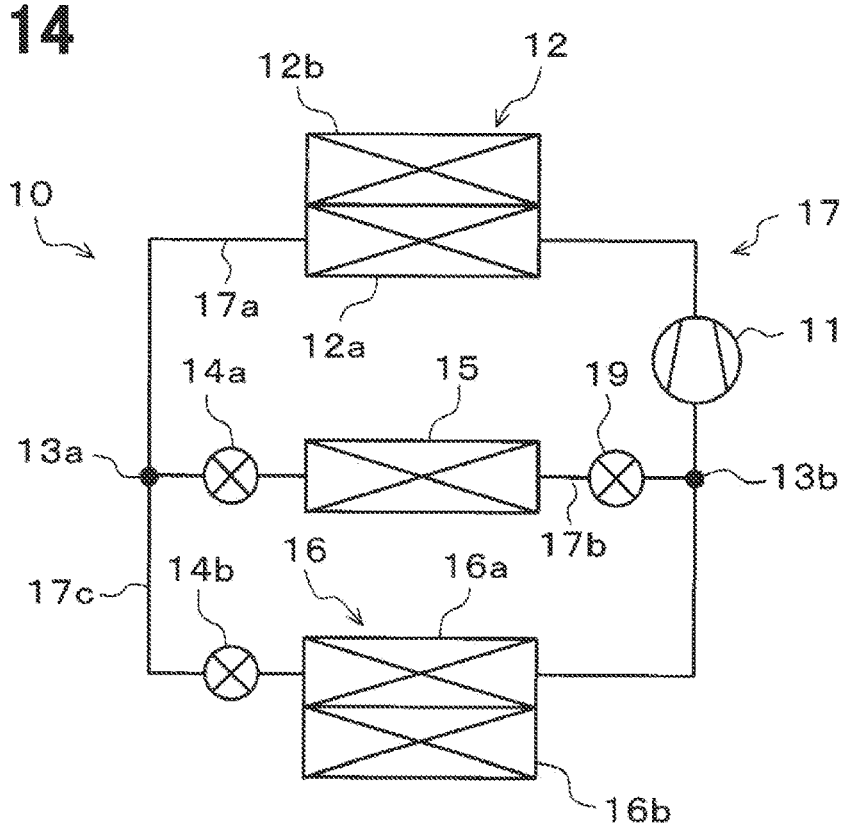
FIG. 14 is a modification of a refrigeration cycle in the vehicle air conditioner.

For example, as illustrated in FIG. 14, a shutdown mechanism unit 19 may be disposed at the outlet of the air-conditioning evaporator 15. The shutdown mechanism unit 19 is configured to open and close the refrigerant flow path at the outlet of the air-conditioning evaporator 15, and, for example, can include an on-off valve or a check valve. When the condensation condition is satisfied, the operation of the shutdown mechanism unit 19 is controlled to close the refrigerant flow path at the outlet of the air-conditioning evaporator 15 as the condensation suppression operation. As a result, the inflow of the gas-phase refrigerant into the air-conditioning evaporator 15 from the outlet can be suppressed, and condensation and liquefaction of the refrigerant in the air-conditioning evaporator 15 can be suppressed.

In the above-described embodiment, the first expansion valve 14a has a full-close function. For this reason, the first expansion valve 14a has a function as a decompression unit for the air-conditioning evaporator 15 and a function as an air-conditioning flow rate adjustment unit that adjusts the flow rate of the refrigerant flowing into the air-conditioning evaporator 15, but the present invention is not limited to this configuration. That is, the configuration as the decompression unit for the air-conditioning evaporator 15 and the configuration as the air-conditioning flow rate adjustment unit may be individually disposed. The on-off valve may be disposed as the air-conditioning flow rate adjustment unit and the mechanical expansion valve may be disposed as the decompression unit.

In the embodiment described above, the refrigerant saturation temperature acquisition unit includes the junction pressure sensor 52f, but the present invention is not limited this configuration. For example, the refrigerant saturation temperature in the air-conditioning evaporator 15 may be calculated by disposing a low pressure sensor that detects the refrigerant pressure on the low pressure side in the refrigeration cycle 10, instead of the sensor at the merging portion, and using the detected refrigerant pressure on the low pressure side. Alternatively, a value of a refrigerant temperature sensor that detects a refrigerant temperature in the refrigeration cycle 10 on a low-pressure side (including a merging portion) may be used.

Further, in the above-described embodiment, the battery B is used as the heat generating device, but the present invention is not limited to this aspect. The heat generating device may be an in-vehicle device that generates heat with an operation, and can include various devices. For example, a traveling inverter, a traveling motor, an engine, a DC-DC converter, a motor generator, a power control unit, a control device for an advanced driving assistance system (so-called ADAS), and the like mounted on a vehicle can also be used as the heat generating device.

In the above-described embodiment, the special operation is the ON operation of the air conditioner switch in the state where the battery chilling request is ended, but the present invention is not limited thereto. For example, the operation may be when the ignition switch of the vehicle is turned off. Accordingly, it is estimated that the user gets off the vehicle when the ignition switch is turned off. Therefore, it is less necessary to maintain the dehumidifying/heating mode when the ignition switch is turned on next time.

Although the present disclosure is described in accordance with examples, it is understood that the present disclosure is not limited to the examples and structures. The present disclosure also includes various modification examples and modifications within an equivalent range. In addition, various combinations and modes, and other combinations and modes including only one element, more elements, or less elements therein are also within the scope and idea of the present disclosure.

What is claimed is:

1. An air conditioner for a vehicle comprising:
a refrigeration cycle including a compressor that compresses and discharges a refrigerant, a condenser that condenses a high pressure refrigerant discharged from the compressor, an air-conditioning evaporator that evaporates a refrigerant flowing out of the condenser by heat exchange with blown air blown to a space to be air-conditioned, a chilling evaporator that evaporates a refrigerant flowing out of the condenser, an air-conditioning side flow path formed so that a refrigerant passes through the air-conditioning evaporator, a detour flow path formed so that a refrigerant is detoured around the air-conditioning evaporator, and an air-conditioning flow rate adjustment unit disposed in the air-conditioning side flow path to decompress a refrigerant flowing into the air-conditioning evaporator and adjust a flow rate of a refrigerant flowing into the air-conditioning evaporator;
a heating unit that is disposed downstream of the air-conditioning evaporator in a flow direction of the blown air and heats at least part of the blown air that has passed through the air-conditioning evaporator; and
a control unit that controls an operation of at least the air-conditioning flow rate adjustment unit, wherein
the control unit includes a determination unit that determines whether a condensation condition is satisfied, under which condensation of a refrigerant in the air-conditioning evaporator is assumed to occur, when a refrigerant is flowing through the chilling evaporator via the detour flow path in a state where an inflow of a refrigerant into the air-conditioning evaporator is prohibited by the air-conditioning flow rate adjustment unit,
when the determination unit determines that the condensation condition is satisfied, the control unit controls an inflow amount of a refrigerant into the air-conditioning evaporator as a condensation suppression operation for suppressing condensation of a refrigerant in the air-conditioning evaporator,
the chilling evaporator evaporates a refrigerant flowing out of the condenser by heat exchange with a heat medium circulating in a heat medium circuit,
the heat medium circuit includes a device heat exchange unit that exchanges heat between a heat generating device and a heat medium, an outside air heat exchanger that exchanges heat between the heat medium and an outside air, and a switching unit that switches a circulation flow path of a heat medium to pass through the device heat exchange unit or the outside air heat exchanger, and
when the switching unit switches the circulation flow path to pass through the outside air heat exchanger in a state where the air-conditioning flow rate adjustment unit allows an inflow of a refrigerant into the air-conditioning evaporator as the condensation suppression operation, the control unit controls the air-conditioning flow rate adjustment unit to continue to allow an inflow of a refrigerant into the air-conditioning evaporator.

2. The air conditioner according to claim 1, further comprising:
an operation unit for a switching operation for switching presence or absence of chilling of the blown air by the air-conditioning evaporator, wherein
the control unit causes the determination unit to make a determination on the condensation condition when the air-conditioning evaporator is set not to chill the blown air by a switching operation by the operation unit.

3. The air conditioner according to claim 1, further comprising:
an operation unit for a switching operation for switching presence or absence of chilling of the blown air by the air-conditioning evaporator, wherein
when a special operation using the operation unit is performed in a state where the air-conditioning flow rate adjustment unit allows an inflow of a refrigerant into the air-conditioning evaporator as the condensation suppression operation, the control unit allows an operation of the air-conditioning flow rate adjustment unit in conjunction with an operation of the operation unit.

4. The air conditioner according to claim 1, further comprising:
a suction air temperature acquisition unit that acquires a suction air temperature that is a temperature of the blown air flowing into the air-conditioning evaporator; and
a refrigerant saturation temperature acquisition unit that acquires a refrigerant saturation temperature of a refrigerant in the air-conditioning evaporator, wherein
the refrigeration cycle includes a chilling flow rate adjustment unit that decompresses a refrigerant flowing into the chilling evaporator and adjusts a flow rate of a refrigerant flowing into the chilling evaporator,
the control unit controls at least the air-conditioning flow rate adjustment unit and the chilling flow rate adjustment unit, and
when the determination unit determines that the condensation condition is satisfied, the control unit adjusts an amount of pressure reduction in the chilling flow rate adjustment unit so that the refrigerant saturation temperature is lower than the suction air temperature as a condensation suppression operation for suppressing condensation of a refrigerant in the air-conditioning evaporator.

5. The air conditioner according to claim 1, further comprising:
a suction air temperature acquisition unit that acquires a suction air temperature that is a temperature of the blown air flowing into the air-conditioning evaporator; and
a refrigerant saturation temperature acquisition unit that acquires a refrigerant saturation temperature of a refrigerant in the air-conditioning evaporator, wherein
the determination unit determines that the condensation condition is satisfied when the refrigerant saturation temperature is higher than the suction air temperature.

6. The air conditioner according to claim 1, further comprising:
a heat medium temperature acquisition unit that acquires a heat medium temperature that is a temperature of the heat medium circulating in the heat medium circuit; and
a suction air temperature acquisition unit that acquires a suction air temperature that is a temperature of the blown air flowing into the air-conditioning evaporator, wherein
the determination unit determines that the condensation condition is satisfied when the heat medium temperature is higher than the suction air temperature.

7. The air conditioner according to claim 1, further comprising:
a suction air temperature acquisition unit that acquires a suction air temperature that is a temperature of the blown air flowing into the air-conditioning evaporator, wherein
when a target heat medium temperature set as a target value of a heat medium temperature that is a temperature of the heat medium circulating in the heat medium circuit is higher than the suction air temperature, the determination unit determines that the condensation condition is satisfied.

8. The air conditioner according to claim 1, wherein
the heating unit includes the condenser of the refrigeration cycle, and heats the blown air using heat of a high pressure refrigerant condensed by the condenser as a heat source.

* * * * *